United States Patent
Yin et al.

(10) Patent No.: US 11,503,560 B2
(45) Date of Patent: Nov. 15, 2022

(54) TIME SYNCHRONIZATION OFFSET ADJUSTMENT METHOD AND APPARATUS, TERMINAL, AND ACCESS LAYER DEVICE

(71) Applicant: Huawei Technologies Co., Ltd., Shenzhen (CN)

(72) Inventors: Zhaogen Yin, Shanghai (CN); Jihong Li, Shanghai (CN); Daoxiang Dou, Shanghai (CN); Ziqiang Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/160,558

(22) Filed: Jan. 28, 2021

(65) Prior Publication Data

US 2021/0153151 A1    May 20, 2021

Related U.S. Application Data

(63) Continuation of application No. PCT/CN2019/097683, filed on Jul. 25, 2019.

(30) Foreign Application Priority Data

Jul. 29, 2018  (CN) .......................... 201810850897.5

(51) Int. Cl.
*H04W 56/00* (2009.01)
*G01S 19/25* (2010.01)

(52) U.S. Cl.
CPC ......... *H04W 56/005* (2013.01); *G01S 19/256* (2013.01)

(58) Field of Classification Search
CPC .......................... H04W 56/005; G01S 19/256
See application file for complete search history.

(56) References Cited

U.S. PATENT DOCUMENTS

2008/0049743 A1    2/2008  Zampetti
2008/0259966 A1*  10/2008  Baird ................. H04N 21/6332
                                                                370/503

(Continued)

FOREIGN PATENT DOCUMENTS

CN         101075848 A      11/2007
CN         101247169 A       8/2008

(Continued)

OTHER PUBLICATIONS

"IEEE Standard for a Precision Clock Synchronization Protocol for Networked Measurement and Control Systems," IEEE Instrumentation and Measurement Society, IEEE Std 1588, Revisioni of IEEE Std 1588-2002, Jul. 24, 2008, 289 pages.

(Continued)

*Primary Examiner* — Huy D Vu
*Assistant Examiner* — Bailor C Hsu
(74) *Attorney, Agent, or Firm* — Slater Matsil, LLP

(57) ABSTRACT

Embodiments of this application provide a time synchronization offset adjustment method and apparatus, a terminal, and an access layer device. The method includes: compensating, on a 1588 terminal or an access layer device based on a 1588 time offset value, for a 1588 time obtained through (Continued)

synchronization. This reduces an error caused by asymmetric delays on transmit and receive links, and improves precision of the 1588 time obtained through synchronization.

19 Claims, 10 Drawing Sheets

(56) References Cited

U.S. PATENT DOCUMENTS

| | | | |
|---|---|---|---|
| 2011/0013737 A1* | 1/2011 | Lee | G04C 11/04 375/356 |
| 2011/0035511 A1* | 2/2011 | Biederman | G04G 7/00 709/248 |
| 2011/0200051 A1* | 8/2011 | Rivaud | H04J 3/0641 370/503 |
| 2014/0192797 A1* | 7/2014 | Licardie | H04J 3/0658 370/350 |
| 2015/0092793 A1 | 4/2015 | Aweya | |
| 2015/0181385 A1* | 6/2015 | Zampetti | H04W 56/0035 370/326 |
| 2016/0094270 A1 | 3/2016 | Seller | |
| 2016/0149658 A1 | 5/2016 | Xia et al. | |
| 2016/0302165 A1* | 10/2016 | Da | H04W 56/001 |
| 2018/0013508 A1* | 1/2018 | Rabinovich | H04J 3/0679 |
| 2018/0348376 A1* | 12/2018 | Derbez | G01S 19/256 |

FOREIGN PATENT DOCUMENTS

| | | |
|---|---|---|
| CN | 101834712 A | 9/2010 |
| CN | 101932092 A | 12/2010 |
| CN | 102056285 A | 5/2011 |
| CN | 102263629 A | 11/2011 |
| CN | 102378350 A | 3/2012 |
| CN | 103138863 A | 6/2013 |
| CN | 103812595 A | 5/2014 |
| CN | 104981010 A | 10/2015 |
| CN | 106911414 A | 6/2017 |
| CN | 105429725 B | 6/2018 |
| EP | 3226504 A1 | 10/2007 |

OTHER PUBLICATIONS

Tseng, W.H. et al., "Precise UTC Dissemination through Future Telecom Synchronization Networks," 2015 Joint Conference of the IEEE International Frequency Control Symposium and the European Frequency and Time Forum, XP033168188, Apr. 12, 2015, 4 pages.

* cited by examiner

TIME SYNCHRONIZATION OFFSET ADJUSTMENT METHOD AND APPARATUS, TERMINAL, AND ACCESS LAYER DEVICE

CROSS-REFERENCE TO RELATED APPLICATIONS

This application is a continuation of International Application No. PCT/CN2019/097683, filed on Jul. 25, 2019, which claims priority to Chinese Patent Application No. 201810850897.5, filed on Jul. 29, 2018. The disclosures of the aforementioned applications are hereby incorporated by reference in their entireties.

TECHNICAL FIELD

The present invention relates to the field of communications technologies, and in particular, to a time synchronization offset adjustment method and apparatus, a terminal, and an access layer device.

BACKGROUND

In a mobile communications technology, time synchronization between devices needs to be ensured, to ensure correct data receiving and sending. For example, in both a long term evolution (LTE) system and a 5th generation mobile communications technology (5G) system, strict time synchronization is required, to ensure normal service running. Higher time synchronization precision indicates a higher correct ratio of data receiving and sending and higher communication efficiency.

Currently, a solution of performing precise time synchronization based on the standard for a precision clock synchronization protocol for networked measurement and control systems formulated by the institute of electrical and electronics engineers (IEEE) (IEEE standard for a precision clock synchronization protocol for networked measurement and control systems, IEEE 1588 protocol or 1588 protocol) has been widely applied and has developed to the second version, which is referred to as the IEEE 1588 version 2 protocol or the 1588v2 protocol for short.

Content of the IEEE 1588v2 protocol is mainly a clock distribution technology. A clock source of the IEEE 1588v2 protocol may be a satellite system, and the satellite system may include a plurality of systems such as a global positioning system (GPS), a BeiDou navigation satellite system, and a global navigation satellite system (GLONASS).

However, due to factors such as an error of a bearer network device, a jitter error, and asymmetry between transmit and receive optical fibers, there is a specific error in precision of performing time synchronization based on the 1588 protocol. Consequently, a time obtained through synchronization based on the 1588 protocol cannot meet a requirement, caused by continuous development of technologies and increasing demands of people, of increasing synchronization time precision of mobile communications system services. The time synchronization solution that is based on the 1588 protocol has time precision of microseconds, or even time precision less than microseconds. However, in an emerging technology such as LTE or 5G, a basic service has synchronization precision of +/−1.5 microseconds, and a coordinated service even has synchronization precision of hundreds of nanoseconds.

SUMMARY

Embodiments of this application provide a time synchronization offset adjustment method and apparatus, a terminal, and an access layer device. A 1588 time synchronization offset can be adjusted, to improve 1588 time precision.

According to a first aspect, a 1588 time offset adjustment method is provided. The method includes A 1588 terminal may compensate for a 1588 time obtained through synchronization. This reduces an error caused by asymmetric delays on transmit and receive links, and improves precision of the 1588 time obtained through synchronization.

In an optional implementation, the method may be implemented in the following steps. A first 1588 terminal obtains a first 1588 time by synchronizing with an upper-level 1588 device of the first 1588 terminal, the first 1588 terminal determines a 1588 time offset value, and the first 1588 terminal compensates for the first 1588 time based on the 1588 time offset value. Therefore, the first 1588 terminal may compensate for an offset of the 1588 time on a terminal side, to compensate for the 1588 time at an edge of a synchronization network, that is, compensate for an offset caused by asymmetry of end to end (E2E) optical fibers, and compensate for a fixed offset inside a device in the synchronization network. Therefore, measurement and compensation do not need to be performed node by node, labor costs are greatly reduced, and precision of the 1588 time is improved.

In another optional implementation, the method further includes The first 1588 terminal receives a first GPS time from a GPS clock source, where the 1588 time offset value is a difference between the first 1588 time and the first GPS time. According to this embodiment of this application, a 1588 terminal performs compensation based on a GPS time, so that precision of a 1588 time obtained after the compensation is close to or reaches precision of the GPS time, and precision of the 1588 time is greatly improved.

In another optional implementation, the method further includes The first 1588 terminal sends the 1588 time offset value to a second 1588 terminal, where the 1588 time offset value is used to compensate for a second 1588 time, and the second 1588 time is a 1588 synchronization time obtained by the second 1588 terminal by synchronizing with the upper-level 1588 device of the first 1588 terminal. According to this embodiment of this application, 1588 terminals served by a same access layer device share a 1588 time offset value, so that some base stations that cannot obtain a reference time by themselves compensate for a 1588 time, and a network deployment difficulty is reduced.

In another optional implementation, the method further includes The first 1588 terminal receives first indication information from a 1588 terminal management device, where the first indication information is used to indicate the first 1588 terminal to send the 1588 time offset value to the second 1588 terminal. According to this embodiment of this application, 1588 terminals share a 1588 time offset value under control of a 1588 terminal management device, so that resource utilization is improved and information disorder is avoided.

In another optional implementation, that the first 1588 terminal sends the 1588 time offset value to the second 1588 terminal may specifically include The first 1588 terminal sends the 1588 time offset value to the second 1588 terminal through the 1588 terminal management device. According to this embodiment of this application, a 1588 terminal management device is used as an intermediate device to implement sharing and transfer of a 1588 time offset value between 1588 terminals, and unified management performed by the 1588 terminal management device is facilitated.

In another optional implementation, that the first 1588 terminal determines the 1588 time offset value includes The first 1588 terminal receives the 1588 time offset value from a third 1588 terminal, where the 1588 time offset value is a difference between a third 1588 time and a third GPS time, the third 1588 time is a 1588 time obtained by the third 1588 terminal by synchronizing with the upper-level 1588 device of the first 1588 terminal, and the third GPS time is a GPS time received by the third 1588 terminal from a GPS clock source. According to this embodiment of this application, a 1588 terminal determines a 1588 time offset value through another 1588 terminal served by a same access layer device, to implement sharing of the 1588 time offset value between 1588 terminals served by the same access layer device, so that a 1588 terminal device that does not have a capability of obtaining a reference signal can also compensate for a 1588 time, and a network deployment difficulty is reduced.

In another optional implementation, that the first 1588 terminal receives the 1588 time offset value from the third 1588 terminal includes The first 1588 terminal receives the 1588 time offset value from the third 1588 terminal through a 1588 terminal management device.

According to a second aspect, a 1588 time offset adjustment method is provided. According to the method, a 1588 time obtained through synchronization may be compensated for on an edge bearer device. This reduces an error caused by asymmetric delays on transmit and receive links, and improves precision of the 1588 time obtained through synchronization.

In an optional implementation, the method may be specifically implemented in the following steps A first 1588 terminal obtains a first 1588 time by synchronizing with an upper-level 1588 device, the first 1588 terminal receives a first GPS time from a GPS clock source, the first 1588 terminal determines a 1588 time offset value, where the 1588 time offset value is a difference between the first 1588 time and the first GPS time, and the first 1588 terminal sends the 1588 time offset value to the first access layer device, where the 1588 time offset value is used to compensate for a fourth 1588 time, and the fourth 1588 time is a 1588 time obtained by the first access layer device by synchronizing with an upper-level 1588 device of the first access layer device. Therefore, the first access layer device may compensate for an offset of the 1588 time at the end of a bearer network, to compensate for the 1588 time at an edge of a synchronization network, that is, compensate for an offset caused by asymmetry of end to end (end to end, E2E) optical fibers, and compensate for a fixed offset inside a device in the synchronization network. Therefore, measurement and compensation do not need to be performed node by node, labor costs are greatly reduced, and precision of the 1588 time is improved.

In another optional implementation, the method may alternatively be specifically implemented in the following steps. A first access layer device obtains a fourth 1588 time by synchronizing with an upper-level 1588 device of the first access layer device, the first access layer device receives a 1588 time offset value, and the first access layer device compensates for the fourth 1588 time based on the 1588 time offset value. Therefore, the first access layer device may compensate for an offset of the 1588 time at the end of a bearer network, to compensate for the 1588 time at an edge of a synchronization network, that is, compensate for an offset caused by asymmetry of end to end (E2E) optical fibers, and compensate for a fixed offset inside a device in the synchronization network. Therefore, measurement and compensation do not need to be performed node by node, labor costs are greatly reduced, and precision of the 1588 time is improved.

In another optional implementation, that the first access layer device compensates for the fourth 1588 time based on the 1588 time offset value includes The first access layer device compensates for the fourth 1588 time on a port between the first access layer device and the upper-level 1588 device of the first access layer device based on the 1588 time offset value, or the first access layer device compensates for the fourth 1588 time on a port between the first access layer device and a 1588 terminal based on the 1588 time offset value, or if a system time of the first access layer device is updated to the fourth 1588 time after the first access layer device obtains the fourth 1588 time, the first access layer device compensates for the internal system time.

In another optional implementation, the method further includes The first access layer device sends the 1588 time offset value to a bearer network management device. According to this embodiment of this application, a bearer network management device may manage a bearer network device based on a 1588 time offset value, for example, perform fault monitoring with reference to a network topology. The bearer network management device may also be used as an intermediate device to implement sharing of the 1588 time offset value between access layer devices.

In another optional implementation, the method further includes The first access layer device receives indication information from the bearer network management device, where the indication information is used to indicate the first access layer device to compensate for the fourth 1588 time based on the 1588 time offset value. According to this embodiment of this application, an access layer device may perform time compensation based on an indication of a bearer network management device, to facilitate unified management and improve system consistency.

In another optional implementation, that the first access layer device receives the 1588 time offset value includes The first access layer device receives the 1588 time offset value from a first 1588 terminal, where the 1588 time offset value is a difference between a first 1588 time and a first GPS time, the first 1588 time is a 1588 time obtained by the first 1588 terminal by synchronizing with the first access layer device, and the first GPS time is a GPS time received by the first 1588 terminal from a GPS clock source. According to this embodiment of this application, an access layer device may obtain a 1588 time offset value from a 1588 terminal managed by the access layer device, so that 1588 time compensation is performed at the access layer device, and measurement and compensation are performed at the end.

In another optional implementation, the method further includes The first access layer device sends the 1588 time offset value to a second access layer device, where the 1588 time offset value is used to compensate for a fifth 1588 time obtained by the second access layer device by synchronizing with an upper-level 1588 device of the second access layer device, where both the first access layer device and the second access layer device are located on a first access ring, and delays on transmit and receive links of the first access ring are symmetric. According to this embodiment of this application, access layer devices on an access ring share a 1588 time offset value, so that a network deployment difficulty is further reduced.

In another optional implementation, that the first access layer device sends the 1588 time offset value to the second access layer device includes The first access layer device sends the 1588 time offset value to the second access layer device through a bearer network management device. In this way, a bearer network management device may be used as an intermediate device to transmit a 1588 time offset value, and the bearer network management device may manage transmission of the 1588 time offset value.

In another optional implementation, that the first access layer device receives the 1588 time offset value includes The first access layer device receives the 1588 time offset value from a third access layer device, where the 1588 time offset value is a difference between a sixth 1588 time and a sixth GPS time, the sixth 1588 time is a 1588 time obtained by a fourth 1588 terminal by synchronizing with the third access layer device, and the sixth GPS time is a GPS time received by the fourth 1588 terminal from a GPS clock source, where both the first access layer device and the third access layer device are located on a first access ring, and delays on transmit and receive links of the first access ring are symmetric.

In another optional implementation, that the first access layer device receives the 1588 time offset value from the third access layer device includes The first access layer device receives the 1588 time offset value from the third access layer device through a bearer network management device.

According to a third aspect, a 1588 time offset adjustment apparatus is provided. The apparatus includes a synchronization unit, configured to obtain a first 1588 time by synchronizing with an upper-level 1588 device of the apparatus, a determining unit, configured to determine a 1588 time offset value, and a compensation unit, configured to compensate for the first 1588 time based on the 1588 time offset value.

In an optional implementation, the apparatus further includes a first receiving unit, configured to receive a first global positioning system GPS time from a GPS clock source, where the 1588 time offset value is a difference between the first 1588 time and the first GPS time.

In another optional implementation, the apparatus further includes a first sending unit, configured to send the 1588 time offset value to a second 1588 terminal, where the 1588 time offset value is used to compensate for a second 1588 time, and the second 1588 time is a 1588 synchronization time obtained by the second 1588 terminal by synchronizing with the upper-level 1588 device of the apparatus.

In another optional implementation, the apparatus further includes a second receiving unit, configured to receive first indication information from a 1588 terminal management device, where the first indication information is used to indicate the first 1588 terminal to send the 1588 time offset value to the second 1588 terminal.

In another optional implementation, the apparatus further includes a second sending unit, configured to send the 1588 time offset value to the second 1588 terminal through the 1588 terminal management device.

In another optional implementation, the determining unit is specifically configured to receive the 1588 time offset value from a third 1588 terminal, where the 1588 time offset value is a difference between a third 1588 time and a third GPS time, the third 1588 time is a 1588 time obtained by the third 1588 terminal by synchronizing with the upper-level 1588 device of the apparatus, and the third GPS time is a GPS time received by the third 1588 terminal from a GPS clock source.

In another optional implementation, the determining unit is specifically configured to receive the 1588 time offset value from the third 1588 terminal through a 1588 terminal management device.

According to a fourth aspect, a 1588 time offset adjustment apparatus is provided. The apparatus includes a synchronization unit, configured to obtain a first 1588 time by synchronizing with a first access layer device, a receiving unit, configured to receive a first GPS time from a GPS clock source, a determining unit, configured to determine a 1588 time offset value, where the 1588 time offset value is a difference between the first 1588 time and the first GPS time, and a sending unit, configured to send the 1588 time offset value to the first access layer device, where the 1588 time offset value is used to compensate for a fourth 1588 time, and the fourth 1588 time is a 1588 time obtained by the first access layer device by synchronizing with an upper-level 1588 device of the first access layer device.

According to a fifth aspect, a 1588 time offset adjustment apparatus is provided. The apparatus includes an obtaining unit, configured to obtain a fourth 1588 time by synchronizing with an upper-level 1588 device of the apparatus, a receiving unit, configured to receive a 1588 time offset value, and a compensation unit, configured to compensate for the fourth 1588 time based on the 1588 time offset value.

In an optional implementation, the compensation unit is specifically configured to compensate for the fourth 1588 time on a port between the apparatus and the upper-level 1588 device based on the 1588 time offset value, or compensate for the fourth 1588 time on a port between the apparatus and a 1588 terminal based on the 1588 time offset value, or if a system time is updated to the fourth 1588 time after the fourth 1588 time is obtained, compensate for the system time.

In another optional implementation, the apparatus further includes a sending unit, configured to send the 1588 time offset value to a bearer network management device.

In another optional implementation, the receiving unit is further configured to receive indication information from the bearer network management device, where the indication information is used to indicate the compensation unit to compensate for the fourth 1588 time based on the 1588 time offset value.

In another optional implementation, the receiving unit is specifically configured to receive the 1588 time offset value from a first 1588 terminal, where the 1588 time offset value is a difference between a first 1588 time and a first GPS time, the first 1588 time is a 1588 time obtained by the first 1588 terminal by synchronizing with the first access layer device, and the first GPS time is a GPS time received by the first 1588 terminal from a GPS clock source.

In another optional implementation, the sending unit is further configured to send the 1588 time offset value to a second access layer device, where the 1588 time offset value is used to compensate for a fifth 1588 time obtained by the second access layer device by synchronizing with an upper-level 1588 device of the second access layer device, where both the first access layer device and the second access layer device are located on a first access ring, and delays on transmit and receive links of the first access ring are symmetric.

In another optional implementation, the sending unit is further configured to send the 1588 time offset value to the second access layer device through a bearer network management device.

In another optional implementation, the receiving unit is further configured to receive the 1588 time offset value from a third access layer device, where the 1588 time offset value is a difference between a sixth 1588 time and a sixth GPS time, the sixth 1588 time is a 1588 time obtained by a fourth 1588 terminal by synchronizing with the third access layer device, and the sixth GPS time is a GPS time received by the fourth 1588 terminal from a GPS clock source, where both the first access layer device and the third access layer device are located on a first access ring, and delays on transmit and receive links of the first access ring are symmetric.

In another optional implementation, the receiving unit is specifically configured to receive the 1588 time offset value from the third access layer device through a bearer network management device.

According to a sixth aspect, a 1588 terminal is provided. The terminal includes a communications module, a processor, and a memory, where the memory is configured to store a program, the communications module is configured to interact with an access layer device or a 1588 terminal, and the processor is configured to execute the program stored in the memory, to control the 1588 terminal to perform the method performed by the 1588 terminal according to the first aspect or the second aspect.

According to a seventh aspect, another 1588 terminal is provided. The terminal includes a communications module, a GPS transceiver, a processor, and a memory, where the memory is configured to store a program, the communications module is configured to interact with an access layer device, a 1588 terminal, or a 1588 terminal management device, the GPS transceiver is configured to receive a GPS time, and the processor is configured to execute the program stored in the memory, to control the 1588 terminal to perform the method performed by the 1588 terminal according to the first aspect or the second aspect.

According to an eighth aspect, an access layer device is provided. The access layer device includes a communications module, a processor, and a memory, where the memory is configured to store a program, the communications module is configured to interact with a 1588 terminal, a bearer network device, or a bearer network management device, and the processor is configured to execute the program stored in the memory, to control the access layer device to perform the method performed by the access layer device according to the second aspect.

According to a ninth aspect, a computer-readable storage medium is provided. The computer-readable storage medium includes a computer-readable instruction, and when the computer instruction is executed by a processor, the method according to any one or more of the first aspect, the second aspect, or the third aspect is implemented.

According to a tenth aspect, a computer program product including an instruction is provided. The computer-readable storage medium stores a computer program, and when the program is run on a computer, the computer is enabled to perform the method according to any one or more of the first aspect, the second aspect, or the third aspect.

DETAILED DESCRIPTION OF ILLUSTRATIVE EMBODIMENTS

The following describes the technical solutions in the embodiments of this application with reference to the accompanying drawings in the embodiments of this application.

In the embodiments of this application, descriptions such as "first" or "second" are merely for clarity of description, and do not constitute any limitation in some cases. For example, a "first 1588 terminal" and a "second 1588 terminal" are merely intended to distinguish between different 1588 terminals. During specific implementation, the "first 1588 terminal" may also be referred to as a "second 1588 terminal", and the "second 1588 terminal" may also be referred to as a "first 1588 terminal". Herein, "first" and "second" do not constitute a limitation on the 1588 terminals.

Figure 1:
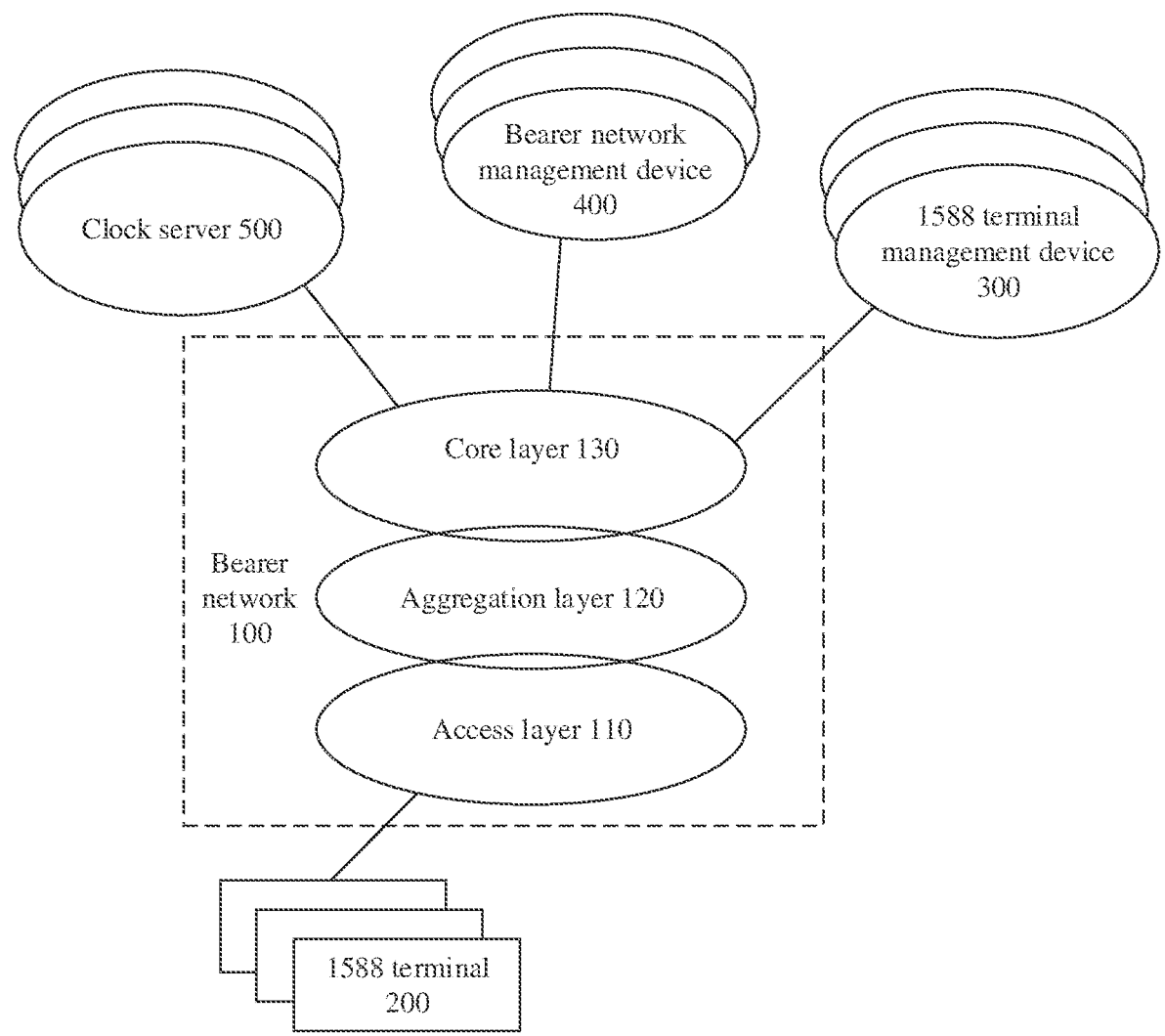
FIG. 1 is a schematic architectural diagram of a mobile communications system.

The technical solutions provided in the embodiments of this application are applicable to a mobile communications system shown in FIG. 1. With reference to FIG. 1, the communications system includes a bearer network 100, a 1588 terminal 200, and a clock server 500. The 1588 terminal 200 is connected to the bearer network 100, and the bearer network 100 is connected to the clock server 500. The bearer network 100 is located between the 1588 terminal 200 and the clock server 500, so that the 1588 terminal obtains a 1588 time through the bearer network.

The communications system supports the 1588 protocol. The 1588 protocol may be a 1588 protocol of any version, or a protocol evolved based on the IEEE 1588v2 protocol or the 1588v2 protocol, for example, G.827x series standards formulated by the international telecommunication union telecommunication standardization sector (ITU-T), including G.8271, G.8272, G.8273, G.8273.1, G.8273.2, G.8275, G.8275.1, and G.8275.2. The G.827x series standards relate to aspects such as a network architecture, a networking model, network-level and network element-level indicator requirements, a time server indicator requirement, and protection switchover for 1588v2 high-precision time synchronization.

The 1588 terminal in the communications system may be a device that supports the 1588 protocol. For example, the 1588 terminal may be a base station or a PTN end transmission device. The base station may include a small cell, a macro base station, an indoor distributed base station, or the like.

The clock server 500 in the communications system may be a server that provides a clock in a process of performing time synchronization based on the 1588 protocol. A clock source of the clock server may be a satellite system or a terrestrial system. The satellite system may be a GPS, a BeiDou navigation satellite system, a GLONASS, or the like. The terrestrial system may be a building integrated timing supply system (BITS) or the like.

Optionally, the communications system shown in FIG. 1 may further include another network device, and the another network device may be connected to a core layer 130, the another network device may include a core network device (for example, a mobility management entity (MME), or a core network service gateway (SGW) or a core network internet gateway (PGW) in an evolved packet core (EPC)).

Optionally, the communications system may further include one or more 1588 terminal management devices 300 and a bearer network management device 400. The 1588 terminal management device 300 is connected to the 1588 terminal through the bearer network 100, to manage the 1588 terminal. The bearer network management device 400 is connected to the bearer network 100 and manages the bearer network 100.

Optionally, the bearer network 100 in the communications system may be designed based on a standard three-layer structure, and three layers are an access layer 110, an aggregation layer 120, and the core layer 130.

For example, the core layer 130 mainly provides high-bandwidth service bearing and transmission, and completes interconnection and interworking with another network. The aggregation layer 120 mainly aggregates and distributes user service data to service access nodes, and classifies services into different service classes. The access layer 110 uses a plurality of access technologies, to perform bandwidth and service allocation, implement user access, and complete multiplexing and transmission of a plurality of services.

The access layer 110 may include one or more devices, and a device at the access layer 110 may be referred to as an access layer device. The aggregation layer 120 may include one or more devices, and a device at the aggregation layer 120 may be referred to as an aggregation layer device. The core layer 130 may include one or more devices, and a device at the core layer 130 may be referred to as a core layer device. The access layer device, the aggregation layer device, or the core layer device may be referred to as a bearer network device.

Figure 2:
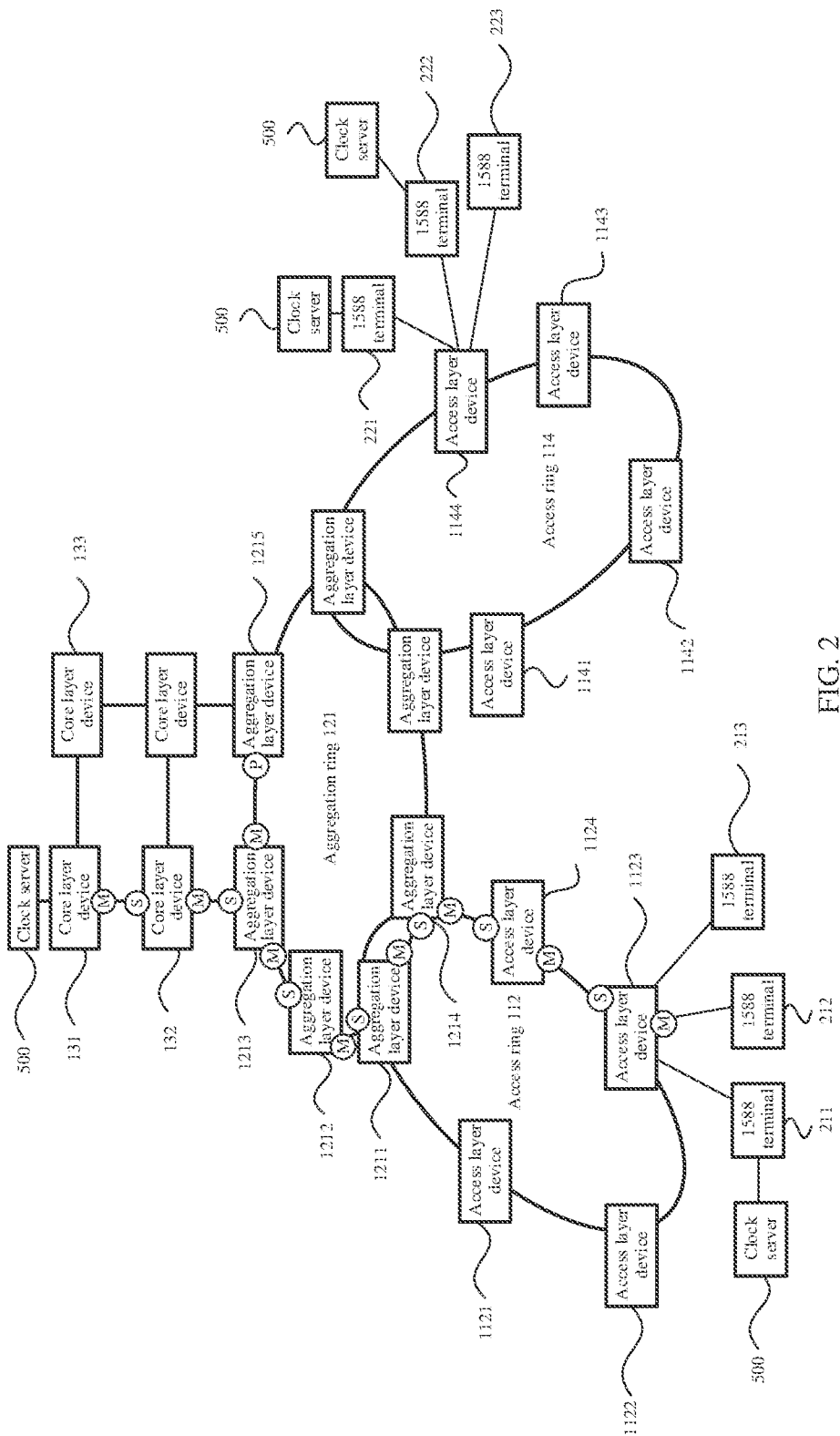
FIG. 2 is a schematic architectural diagram of a bearer network.

As shown in FIG. 2, the access layer 110 and the aggregation layer 120 may establish a system by using a ring structure. The access layer 110 may include a plurality of access rings, and each access ring may include a plurality of access layer devices. The aggregation layer 120 may include a plurality of aggregation rings, and each aggregation ring may include a plurality of aggregation layer devices.

In FIG. 2, the access layer 110 may include an access ring 112, an access ring 114, and the like, and the aggregation layer may include an aggregation ring 121 and the like. The access ring 112 may include access layer devices 1121, 1122, 1123, 1124, and the like. The access ring 114 may include access layer devices 1141, 1142, 1143, 1144, and the like. The aggregation layer may include aggregation layer devices 1221, 1222, 1223, 1224, and the like.

For example, the bearer network is networked by using a packet transport network (PTN) device. During networking, a ring is formed at the access layer at a gigabit ethernet (GE) rate, a ring is formed at the aggregation layer at a 10 gigabit ethernet rate, and a dual-node ring connection structure is used to avoid a risk of a failure of a single node such as an aggregation node or a backbone node. At a backbone layer, each backbone layer node is directly connected to a related core layer node through a GE or 10 gigabit ethernet link provided by an optical transport network (OTN). A person skilled in the art may understand that this application is not limited to PTN device networking. For example, any network device such as a router may also be used for networking. This is not specifically limited in this application.

It should be noted that, in the system shown in FIG. 1, the bearer network 100 is optional. When the bearer network 100 does not exist, the 1588 terminal may be directly connected to the clock server.

In the communications systems shown in FIG. 1 and FIG. 2, the 1588 terminal may obtain a time from the clock server based on the 1588 protocol. In a first implementation, the 1588 terminal may obtain the time of the clock server through the bearer network in a hop-by-hop synchronization manner. For example, the clock server synchronizes the time to a bearer network device, and the bearer network device synchronizes the time to the 1588 terminal. In a second implementation, the 1588 terminal may directly perform time synchronization with the clock server, and the clock server directly synchronizes the time to the 1588 terminal. In this process, if there is a bearer network device between the 1588 terminal and the clock server, the intermediate bearer network device may transparently transmit information in the time synchronization process between the 1588 device and the clock server.

The following further describes the first implementation with reference to FIG. 2.

As shown in FIG. 2, a core layer device 131 may obtain a 1588 time from the clock server 500. For example, the core layer device 131 may include a GPS module, and may receive a GPS time through the GPS module. Alternatively, the clock server 500 may be integrated into the core layer device, in this case, the core layer device 131 may be used as a clock server. The following uses a time synchronization process of a 1588 terminal 211 as an example for description.

First, the core layer device 131 obtains a GPS time (which may alternatively be another satellite system time, and the GPS time is used as an example herein).

Then, the core layer device 131 serves as an upper-level 1588 device and synchronizes a 1588 time to a core layer device 132. A process may be specifically A port (an M port shown in FIG. 2), in a 1588 master working mode, of the core layer device 131 synchronizes the 1588 time to a port (an S port shown in FIG. 2), in a slave working mode, of the core layer device 132, and after obtaining the 1588 time, the core layer device 132 may send the 1588 time to a port, in the 1588 master working mode, of the core layer device 132. A 1588 time synchronization process between the following devices may be understood with reference to this process.

The core layer device 132 serves as an upper-level 1588 device and synchronizes the 1588 time to an aggregation layer device 1213, then the aggregation layer device 1213 serves as an upper-level 1588 device and synchronizes the 1588 time to an aggregation layer device 1212, then the aggregation layer device 1212 serves as an upper-level 1588 device and synchronizes the 1588 time to an aggregation layer device 1211, then the aggregation layer device 1211 serves as an upper-level 1588 device and synchronizes the 1588 time to an aggregation layer device 1214, then the aggregation layer device 1214 serves as an upper-level 1588 device and synchronizes the 1588 time to an access layer device 1124, then the access layer device 1124 serves as an upper-level 1588 device and synchronizes the 1588 time to an access layer device 1123, and then the access layer device 1123 serves as an upper-level 1588 device and synchronizes the 1588 time to the 1588 terminal 211.

In this embodiment of this application, a device that supports the 1588 protocol may be referred to as a 1588 device, and the 1588 device may include a clock server, a core layer device, an aggregation layer device, an access layer device, a 1588 terminal, or the like. Another 1588 device in FIG. 2 also performs time synchronization in a same manner, and refer to the foregoing content.

The following further explains a synchronization process between a 1588 device and an upper-level 1588 device. The 1588 device may include one or more clocks, for example, a clock of an internal system, a clock of an M port, and a clock of an S port. In S310, the upper-level 1588 device sends a synchronization (sync) packet at a moment $t_1$, and includes a timestamp $t_1$ in the packet.

For example, the upper-level 1588 device may include the timestamp $t_1$ of the clock of the M port in the packet.

S320: The 1588 device receives the sync packet at a moment $t_2$, generates a timestamp $t_2$, and extracts the timestamp $t_1$ from the packet.

For example, the 1588 device may generate the timestamp $t_2$ of the clock of the S port, and extract the timestamp $t_1$ from the packet.

S330: The 1588 device sends a delay request (Delay_Req) packet at a moment $t_3$, and generates a timestamp $t_3$.

For example, the 1588 device may generate the timestamp $t_3$ of the clock of the S port.

S340: The upper-level 1588 device receives the Delay_Req packet at a moment $t_4$, generates a timestamp $t_4$, then includes the timestamp $t_4$ in a delay response (Delay_Resp) packet, and returns the delay response packet to the lower-level 1588 device.

For example, the upper-level 1588 device may include the timestamp $t_1$ of the clock of the M port in the packet.

S350: The 1588 device receives the Delay_Resp packet, and extracts the timestamp $t_4$ from the packet.

For example, the 1588 device may extract the timestamp $t_4$, and the 1588 device may calculate a time offset O between the 1588 device and the upper-level 1588 device by using $t_1$, $t_2$, $t_3$, and $t_4$.

It is assumed that a sending path delay from the upper-level 1588 device to the 1588 device is $D_{ms}$, a sending path delay from the 1588 device to the upper-level 1588 device is $D_{sm}$, and the time offset between the 1588 device and the upper-level 1588 device is O. In this case:

$$t_2 - t_1 = D_{ms} + O,$$

$$t_4 - t_3 = D_{sm} - O, \text{ and}$$

$$O = [(t_2 - t_1) - (t_4 - t_3) - (D_{ms} - D_{sm})]/2.$$

If $D_{ms} = D_{sm}$, that is, delays on transmit and receive links between the 1588 device and the upper-level 1588 device are symmetric, $$O = [(t_2 - t_1) - (t_4 - t_3)]/2.$$

In this way, the 1588 device may calculate the time offset O between the 1588 device and the upper-level 1588 device based on the four timestamps $t_1$, $t_2$, $t_3$, and $t_4$, and adjust a time of the 1588 device based on O, to obtain a 1588 time by performing time synchronization with the upper-level 1588 device. For example, the 1588 device may obtain the 1588 time by increasing or decreasing the time of the 1588 device by the time offset O, where the time of the 1588 device may be a time of the internal system of the 1588 device, and the 1588 device synchronizes the 1588 time obtained in the internal system to clocks of ports of the 1588 device, for example, to the clock of the M port and the clock of the S port.

For another example, when the 1588 device performs time synchronization with the upper-level 1588 device according to the ITU-T G.8275.1 protocol, three network node models are defined: a telecom grandmaster (T-GM), a telecom boundary clock (T-BC), and a telecom time slave clock (T-TSC). The T-GM is a root clock in an area, that is, a tree with a master clock as a root is established, and the master clock is the best clock source in an entire network. For a specific calculation manner of time synchronization between devices, refer to the descriptions of FIG. 3.

An internal system and a port of a 1588 device may each include a clock. A time of the internal system may be a time of a clock of the internal system, a time of the port may be a time of a clock of the port, and the clock of the port may be used to generate a timestamp. In a time synchronization solution that is based on the 1588 protocol, working modes of the port of the 1588 device may include at least a 1588 master mode and a 1588 slave mode. When the port works in the 1588 slave mode, the clock of the port serves as a slave clock to synchronize with a clock of a port, in the master mode, of an upper-level device, when the port works in the 1588 master mode, the clock of the port serves as a master clock to provide a clock to the outside. In ports connecting the 1588 device and the upper-level 1588 device, a port of the 1588 device works in the 1588 slave mode, and a port of the upper-level 1588 device works in the master mode. The port of the 1588 device obtains a 1588 timestamp from the port of the upper-level 1588 device and sends the timestamp to the internal system of the 1588 device, after the internal system of the 1588 device calculates a time offset O based on the timestamp, the clock of the internal system may be synchronized with based on the time offset O, and after the clock of the internal system is synchronized with, the clock of the internal system may be synchronized with a clock of the port of the 1588 device. For example, in the 1588 version (v) 2 protocol, 1588 devices may include an ordinary clock (OC) device and a boundary clock (BC) device. The OC device usually has only one physical interface to communicate with a network, and a working mode of the physical interface may be the master mode or the slave mode. The BC device has a plurality of physical interfaces to communicate with the network, and each physical interface performs behavior similar to that of the interface of the OC device and can be connected to a plurality of sub-domains.

The 1588 terminal 200 is an OC device, and the bearer network device (the bearer network device includes an upper-level device of the 1588 terminal) in the bearer network 100 is a BC device.

For another example, in the ITU-T G.8275.1 protocol, a 1588 device may be a T-GM device, a T-BC device, or a T-TSC device. The T-GM device may be considered as an OC device (which is a GM that has only one port, where the port works in the master mode) that can only work in the master mode. The T-GM device may alternatively be considered as a BC device (which is a GM that may have a plurality of ports, where the ports work in the master mode) that can only work in the master mode. The T-BC device may be a GM or may work in the slave mode to synchronize with another 1588 clock. The T-TSC device may be considered as an OC device (which always works in the slave mode) that can only work in the slave mode.

It can be learned from the foregoing principle that time synchronization that is based on the 1588 protocol is performed on a basis of symmetric delays on transmit and receive links between the 1588 device and the clock server. If the delays on the transmit and receive links between the 1588 device and the clock server are asymmetric, a synchronization offset is introduced, and the offset is equal to half of a difference between the delays on the transmit and receive links. There is a fixed offset inside an intermediate device between the 1588 device and the clock server. Therefore, if a quantity of intermediate devices is larger, an accumulated fixed offset inside the devices is larger.

Asymmetry of 400-meter transmit and receive optical fibers (that is, asymmetry of delays on transmit and receive links) introduces a 1-microsecond time synchronization error, and there is another offset such as an offset inside a device in a multi-stage network. To be specific, in a process in which the 1588 terminal performs time synchronization with the bearer network, devices from the clock server to the 1588 device (the 1588 terminal or an end access device) cross the access layer, the aggregation layer, and the core layer, leading to a very large accumulated fixed offset inside the devices, and a receive link and a transmit link from the end to the clock server are very long, leading to very high delays on the transmit and receive links, and because the receive link and the transmit link are usually not single-fiber bidirectional, and especially, links at the aggregation layer and the core layer are mostly two-fiber bidirectional, when the links are very long, a difference between the delays on the receive link and the transmit link is very large, causing relatively low precision of a 1588 time obtained through synchronization based on the 1588 protocol. Therefore, the time synchronization solution that is based on the 1588 protocol cannot meet requirements of some services that have relatively high requirements on time precision. For example, a 5G basic service has synchronization precision of +/−1.5 microseconds, and a 5G coordinated service has synchronization precision of hundreds of nanoseconds.

The foregoing describes the first implementation, that is, describes that the 1588 terminal may obtain the time of the clock server through the bearer network in the hop-by-hop synchronization manner. The second implementation is similar to the first implementation, that is, an upper-level 1588 device of the 1588 device is the clock server. For a specific synchronization manner, refer to the content of FIG. 3.

In addition, in the communications systems, a GPS receiver may be further deployed on each terminal, and each terminal obtains a high-precision GPS time source from the GPS, to implement time synchronization. In this solution, the terminal is directly connected to a GPS antenna and does not need to be connected to the GPS antenna through the bearer network.

However, to perform the time synchronization directly through the GPS, GPS receivers need to be deployed on all terminals, so that hardware costs are relatively high. In addition, when a GPS receiver of a current terminal is interfered with, an obtained GPS time is inaccurate. Therefore, when the current terminal sends or receives information, a service of the current terminal is affected, and a surrounding terminal is also interfered with, so that fault impact is amplified. In addition, the GPS is easily interfered with.

Based on this, the embodiments of this application provide a 1588 time synchronization offset adjustment solution. A 1588 time offset value may be determined, and a 1588 time may be compensated for at an edge of a synchronization network based on the 1588 time offset value, to improve synchronization precision of the 1588 time and system stability.

In the embodiments of this application, a 1588 device may be a device that supports the 1588 protocol. For example, the 1588 device may be a 1588 terminal, a bearer network device that supports the 1588 protocol, a clock server, or the like, and the bearer network device may be an access layer device, an aggregation layer device, a core layer device, or the like.

In the embodiments of this application, an upper-level device of a device is a device that synchronizes a 1588 time to the device. For example, an upper-level 1588 device of a 1588 terminal may be an access layer device or a clock server, an upper-level 1588 device of an access layer device may be an access layer device or an aggregation layer device, an upper-level 1588 device of an aggregation layer device may be an aggregation layer device or a core layer device, and an upper-level 1588 device of a core layer device may be a clock server.

In the embodiments of this application, that delays on transmit and receive links are symmetric means that a delay on a receive link is equal to a delay on a transmit link. For example, in a case in which links are single-fiber bidirectional, a delay on a receive link is equal to a delay on a transmit link.

To facilitate understanding of the embodiments of this application, the following further describes and explains specific embodiments with reference to the accompanying drawings. The embodiments do not constitute a limitation on the embodiments of this application.

In an embodiment, a 1588 time obtained through synchronization may be compensated for on a 1588 terminal. This reduces an error caused by asymmetric delays on transmit and receive links and an offset inside an intermediate device, and improves precision of the 1588 time obtained through synchronization.

Figure 4:
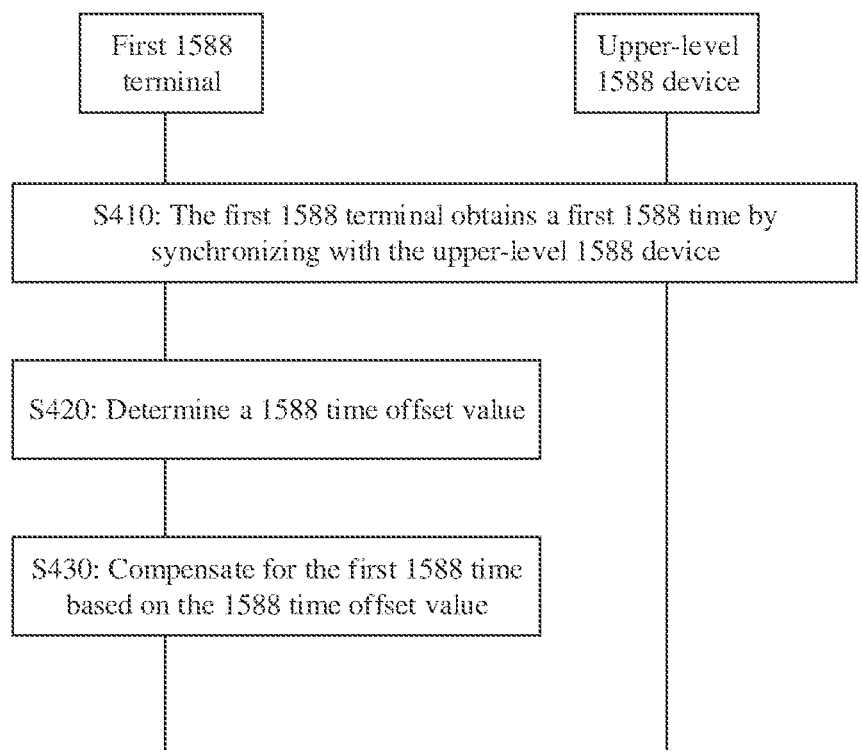
FIG. 4 is a signaling exchange diagram of a 1588 time synchronization offset adjustment method according to an embodiment of this application.

FIG. 4 is a signaling exchange diagram of a 1588 time synchronization offset adjustment method according to an embodiment of this application. The method shown in FIG. 4 is an example in which a 1588 terminal compensates for a 1588 time obtained through synchronization. As shown in FIG. 4, the method specifically includes the following steps:

S410: A first 1588 terminal obtains a first 1588 time by synchronizing with an upper-level 1588 device.

For example, with reference to FIG. 2, the first 1588 terminal may be any 1588 terminal in FIG. 2.

Figure 3:
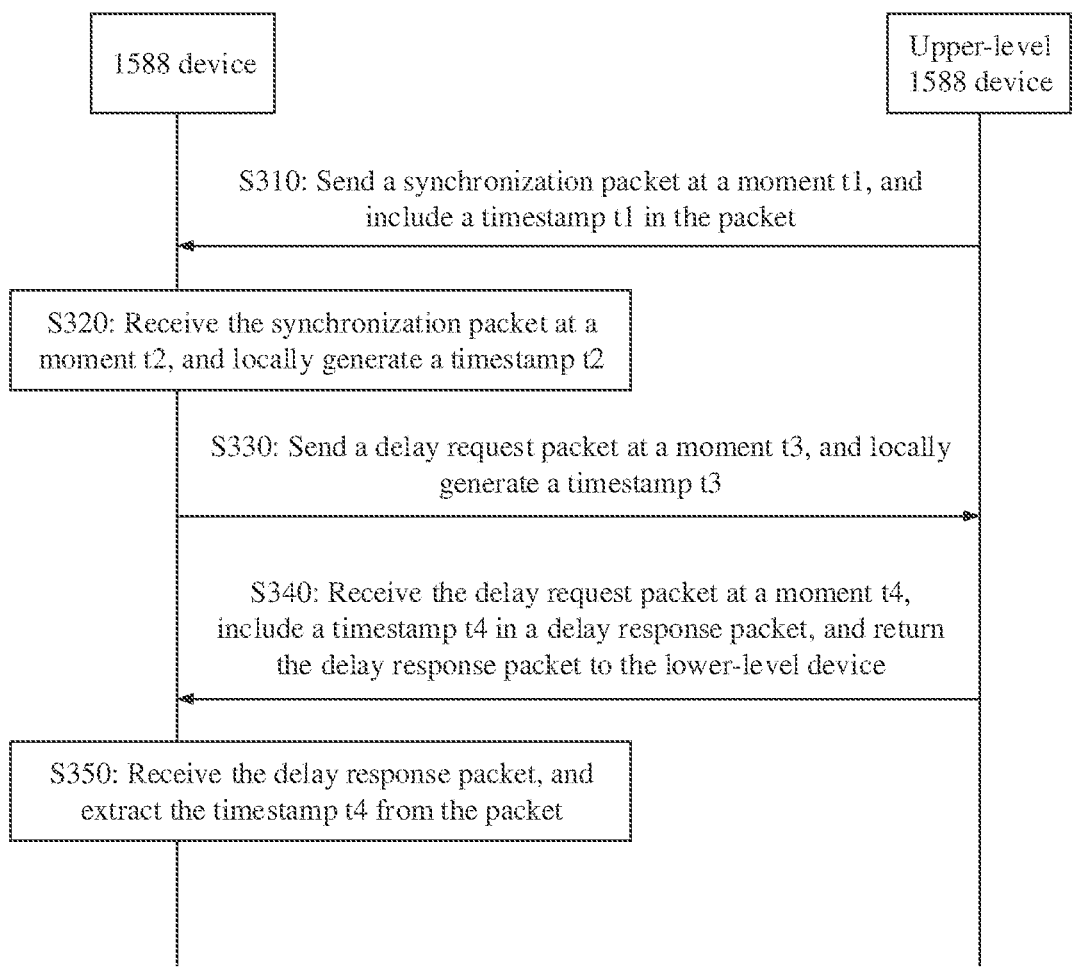
FIG. 3 is a flowchart of performing time synchronization based on the 1588 protocol.

A manner of obtaining the first 1588 time may be the time synchronization manner shown with reference to FIG. 3, where the upper-level 1588 device may include a clock server or an access layer device.

S420: The first 1588 terminal determines a 1588 time offset value.

The 1588 time offset value may be an offset between a 1588 time and a reference time. The reference time may be another time different from the 1588 time, for example, a time with higher precision than the 1588 time. For example, the reference time may be a time received from a satellite system, or may be a synchronization time obtained in another time synchronization manner. The satellite system may be a GPS, a BeiDou navigation satellite system, a GLONASS, or the like.

In addition, the 1588 time offset value may be a difference between a 1588 time of an internal system of the first 1588 terminal and a reference time that are at a same moment, or may be a difference between a 1588 time of a port of the first 1588 terminal and a reference time that are at a same moment.

The 1588 time offset value may be determined before the first 1588 time is obtained, or may be determined after the first 1588 time is obtained.

The 1588 time offset value may be updated periodically. An update frequency may be determined based on actual service and system requirements.

In addition, the first 1588 terminal may be a 1588 terminal that has a capability of obtaining a reference time, or a 1588 terminal that does not have the capability of obtaining a reference time.

When the first 1588 terminal is a 1588 terminal that has the capability of obtaining a reference time, the first 1588 terminal may directly obtain a reference time, and determine a difference between a 1588 time obtained through synchronization and the obtained reference time that are at a same moment. For example, refer to related content of S510 and S512 shown with reference to FIG. 5.

When the first 1588 terminal is a 1588 terminal that does not have the capability of obtaining a reference time, the first 1588 terminal may directly receive a 1588 time offset value, and the 1588 time offset value may be received from a 1588 terminal that is served by a first access layer device and that has the capability of obtaining a reference time, or may be received, through a 1588 terminal management device, from a 1588 terminal that is served by a first access layer device and that has the capability of obtaining a reference time. Upper-level devices of 1588 terminals served by the first access layer device may be the first access layer device. Therefore, compared with an error between a core layer device and a 1588 terminal, an error between time points obtained through synchronization by the 1588 terminals served by the first access layer device may be ignored, especially, an error caused by asymmetric delays on transmit and receive links may be ignored. Therefore, the 1588 time offset value may be shared by the 1588 terminals served by the same access layer device. For example, refer to an embodiment shown with reference to FIG. 6, and an example in which the reference time is a GPS time is used for detailed description.

S430: The first 1588 terminal compensates for the first 1588 time based on the 1588 time offset value.

Compensation means that a 1588 time obtained through synchronization is compensated for by Δt, where Δt is a 1588 time offset value. Therefore, after the compensation, the 1588 time obtained through synchronization is consistent with a current reference time, and synchronization precision of the 1588 time is the same as that of the reference time. For example, a 1588 time obtained through synchronization by the port of the first 1588 terminal may be compensated for by Δt, and a 1588 time obtained through synchronization by the internal system of the first 1588 terminal from the port is a 1588 time obtained after compensation. Alternatively, a 1588 time obtained through synchronization by the internal system of the first 1588 terminal may be compensated for by Δt, and the internal system of the first 1588 terminal synchronizes a 1588 time obtained after compensation to the port.

In this embodiment of this application, the 1588 time offset value used for compensation is an accumulated value of static offsets of E2E paths in a synchronization network, and the static offset of the synchronization network includes a fixed offset (which changes after being reset) inside a bearer network device and an offset (an offset caused by asymmetry of optical fibers) outside a device. When obtaining a 1588 time, a 1588 terminal compensates for the 1588 time based on a 1588 time offset value between the 1588 time and a reference time with higher time precision, that is, compensates for an offset caused by asymmetry of E2E optical fibers, and compensates for a fixed offset inside a device. Therefore, measurement and compensation do not need to be performed node by node, labor costs are greatly reduced, and precision of a 1588 time obtained after the compensation reaches or is close to the precision of the reference time.

A synchronization solution obtained by combining a GPS time synchronization solution with a 1588 time synchronization solution has high reliability. A 1588 standard clock source is located at a position different from that of a 1588 device, and provides a stable and reliable clock source for a base station, so that geographic redundancy can be provided, and GPS interference can be effectively resisted.

Figure 5:
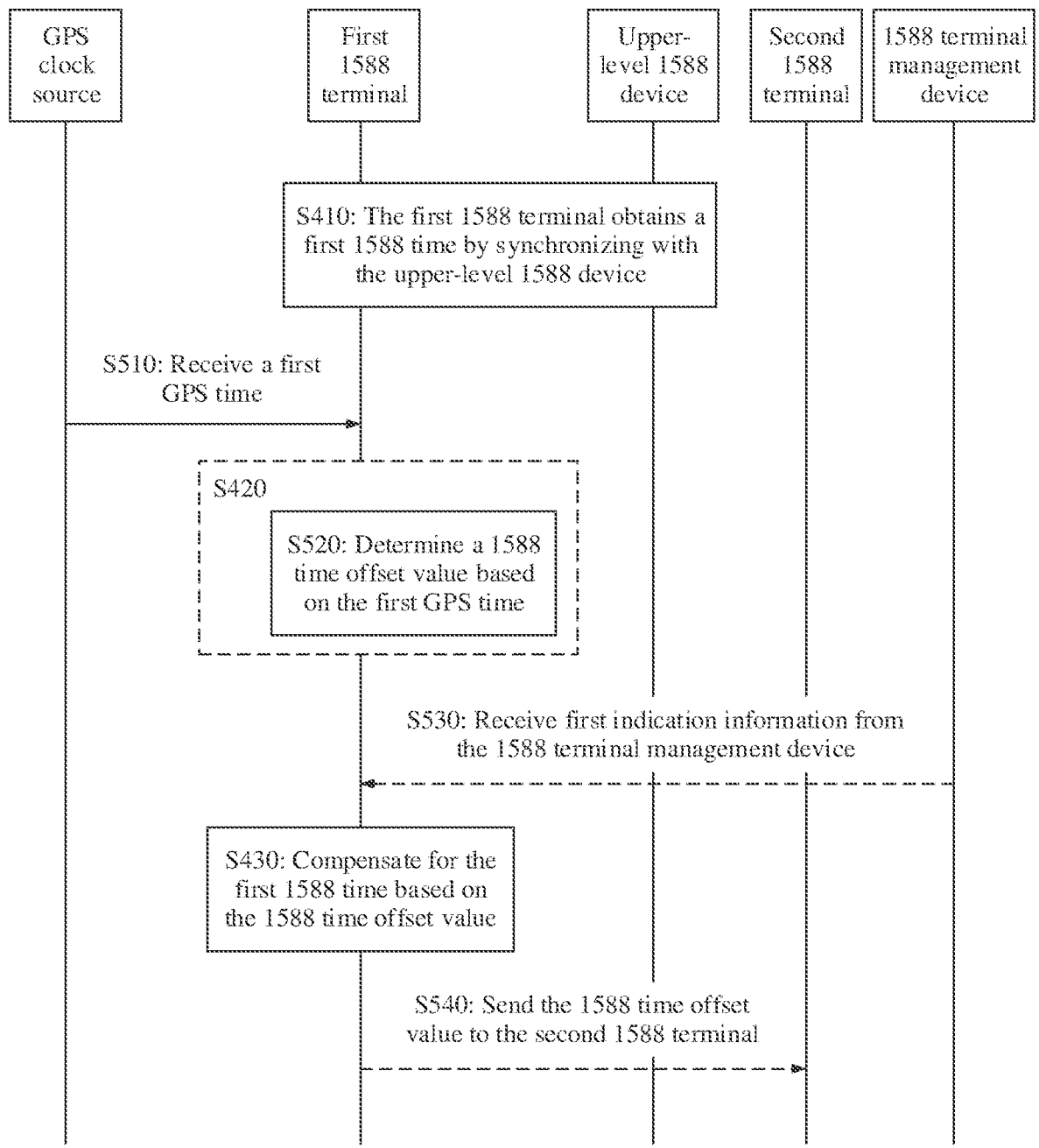
FIG. 5 is a signaling exchange diagram of another 1588 time synchronization offset adjustment method according to an embodiment of this application.

FIG. 5 is a signaling exchange diagram of another 1588 time synchronization offset adjustment method according to an embodiment of this application. The method shown in FIG. 5 is an example of the embodiment shown in FIG. 4. For example, S520 is an example of S420. For related content in S410 and S430 in FIG. 5, refer to related content in S410 and S430 in FIG. 4. Specifically, in this embodiment of this application, an example in which a first 1588 terminal has a capability of obtaining a reference time, the reference time is a GPS time, and an upper-level 1588 device is an access layer device is used for description. It should be noted that the reference time may be another time, for example, a BeiDou navigation satellite system time or a GLONASS time, or may be a time obtained by using another time synchronization protocol, and the upper-level 1588 device may alternatively be another 1588 device, for example, a clock server. This is not limited in this embodiment of this application. The method may further include the following steps.

S510: The first 1588 terminal receives a first GPS time from a GPS clock source.

The first 1588 terminal may locally receive a GPS time. For example, with reference to FIG. 2, in this embodiment of this application, the first 1588 terminal may be a 1588 terminal 211, a 1588 terminal 221, a 1588 terminal 222, or the like, and the 1588 terminal 211, the 1588 terminal 221, or the 1588 terminal 222 may directly receive a GPS time from a satellite system 500.

For example, determining of a 1588 time offset value may be performed aperiodically or periodically. Based on this, the first 1588 terminal may aperiodically or periodically receive a GPS time from the GPS clock source.

For another example, the 1588 time offset value may be determined according to an instruction of a 1588 terminal management device. Based on this, before step S510, the method may further include the following step. S530: The first 1588 terminal receives first indication information from the 1588 terminal management device, where the first indication information is used to indicate the first 1588 terminal to send the 1588 time offset value to a second 1588 terminal. The second 1588 terminal may be any 1588 terminal, other than the first 1588 terminal, served by a first access layer device.

Step S420 may be specifically S520: The first 1588 terminal determines the 1588 time offset value based on the first GPS time.

The 1588 time offset value may be a difference between a first 1588 time and the first GPS time. In this case, the first 1588 time and the first GPS time are received at a same moment. The 1588 time offset value may alternatively be an offset value between the first GPS time and a 1588 time obtained before the first 1588 time is obtained. In this case, a moment at which the first GPS time is received is before a moment at which the first 1588 time is obtained. The 1588 time offset value may alternatively be a time offset value between the first GPS time and a 1588 time obtained after the first 1588 time is obtained. In this case, a moment at which the first GPS time is received is after a moment at which the first 1588 time is obtained.

A 1588 time and a GPS time may use two different time scales. For example, the 1588 time uses a precision time synchronization protocol (PTP) time scale, and the GPS time uses a GPS time scale. In this case, after time points of the two time scales are obtained, a fixed difference between the two time scales needs to be eliminated. For example, the time points are converted to use a same time scale, and then a difference between the two time points is obtained through comparison.

Considering that a GPS signal may be interfered with, when the 1588 time offset value is determined, an offset value between a received GPS time and a received 1588 time may be observed in a time period. Compared with a plurality of 1588 time offset values determined based on GPS time points received at other adjacent moments in the observation period, if a 1588 time offset value determined based on a GPS time received at a current moment is more stable, it is considered that the 1588 time offset value determined based on the GPS time received at the current moment (namely, the first GPS time) is reliable. Compared with a plurality of 1588 time offset values determined based on GPS time points received at other adjacent moments, if a 1588 time offset value determined based on a GPS time received at a current moment changes greatly, it is considered that the 1588 time offset value determined based on the GPS time received at the current moment is unreliable, and the first 1588 terminal needs to continue to receive a GPS time from the GPS clock source, and determines whether a 1588 time offset value determined based on the newly received GPS time is reliable until it is determined that a reliable 1588 time offset value is obtained.

In addition, when the first 1588 terminal has the capability of obtaining a reference time, the first 1588 terminal may send the 1588 time offset value to another 1588 terminal served by the first access layer device, so that the another 1588 terminal served by the first access layer device compensates for a 1588 time obtained through synchronization. In this way, a 1588 terminal that does not have the capability of obtaining a reference time can also compensate for a 1588 time obtained through synchronization. Specifically, the method may further include the following step. S540: The first 1588 terminal may send the 1588 time offset value to the second 1588 terminal, where the 1588 time offset value is used to compensate for a second 1588 time, and the second 1588 time is a 1588 synchronization time obtained by the second 1588 terminal by synchronizing with the upper-level 1588 device based on the 1588 protocol.

For example, with reference to FIG. 2, after determining a 1588 time offset value based on the GPS time, the 1588 terminal 211 may send the 1588 time offset value to a 1588 terminal 212 or a 1588 terminal 213 connected to an access layer device 1123.

In a process in which the first 1588 terminal performs 1588 time synchronization with the first access layer device based on the 1588 protocol, the first access layer device may send a 1588 identifier (identity, ID) of the first access layer device to the first 1588 terminal. Similarly, when the another 1588 terminal served by the first access layer device performs 1588 time synchronization with the first access layer device based on the 1588 protocol, the another 1588 terminal may also obtain the 1588 ID, sent by the first access layer device, of the first access layer device. 1588 terminals may summarize received 1588 IDs to the 1588 terminal management device. A 1588 terminal may determine that a 1588 terminal that obtains a 1588 ID, of an access layer device, the same as that of the 1588 terminal is served by a same access layer device as the 1588 terminal, and the 1588 terminal management device may notify the 1588 device of an identifier or a communication address (for example, a media access control (MAC) address) of another 1588 terminal served by the same access layer device as the 1588 device.

The first 1588 terminal may directly send the 1588 time offset value determined by the first 1588 terminal to another 1588 terminal served by a same access layer device. For example, the first 1588 terminal may send the 1588 time offset value to the another 1588 terminal through an X2 interface.

The first 1588 terminal may alternatively send the 1588 time offset value to the another 1588 terminal through the 1588 terminal management device. Specifically, the first 1588 terminal may send the 1588 time offset value to the 1588 terminal management device, the 1588 terminal management device determines, based on an identifier of the first 1588 terminal and a network topology relationship, the second 1588 terminal connected to the same access layer device as the first 1588 terminal, and sends the 1588 time offset value to the second 1588 terminal, and the second 1588 terminal performs 1588 time synchronization based on the 1588 time offset value.

If there are a plurality of 1588 terminals that are served by a same access layer device and that have a capability of obtaining a GPS time from a GPS clock source, the 1588 terminal management device may designate a 1588 terminal to determine a 1588 time offset value, the designated 1588 terminal transfers and shares the offset value, and then another 1588 terminal served by the access layer device uses the shared 1588 time offset value to perform compensation. Alternatively, the 1588 terminals that have the capability of obtaining a GPS time from a GPS clock source transfer and share 1588 time offset values determined by the 1588 terminals, a 1588 terminal that has the capability of obtaining a GPS time from a GPS clock source preferentially uses a value determined by the 1588 terminal to perform compensation, and a 1588 terminal that does not have the capability of obtaining a GPS time from a GPS clock source uses an average value of the 1588 time offset values shared by all the 1588 terminals that are served by the same access layer device and that have the capability of obtaining a GPS time from a GPS clock source to perform compensation.

For example, with reference to FIG. 2, 1588 terminals connected to an access layer device 1144 include the 1588 terminal 221, the 1588 terminal 222, and a 1588 terminal 223. The 1588 terminal 221 and the 1588 terminal 222 have the capability of obtaining a GPS time, so that either of the 1588 terminal 221 and the 1588 terminal 222 may be designated by the 1588 terminal management device to determine a 1588 time offset value, and the 1588 terminal 221, the 1588 terminal 222, and the 1588 terminal 223 share the 1588 time offset value. Alternatively, the 1588 terminal 221 and the 1588 terminal 222 each determine a 1588 time offset value, and the 1588 terminal 221, the 1588 terminal 222, and the 1588 terminal 223 share the 1588 time offset value. In this case, the 1588 terminal 221 or the 1588 terminal 222 preferentially uses the 1588 time offset value determined by the 1588 terminal 221 or the 1588 terminal 222 to perform compensation, and the 1588 terminal 223 uses an average value of the two 1588 time offset values determined by the 1588 terminal 221 and the 1588 terminal 222 to perform compensation.

Determining of a 1588 time offset value, compensation for a 1588 time, and transferring of the 1588 time offset value may be performed aperiodically or periodically, or may be performed according to an instruction.

According to this embodiment of this application, a 1588 terminal that has a capability of obtaining a GPS time obtains a GPS time. Because precision of the GPS time is higher than precision of a 1588 time, the GPS time may be used as a reference time, and an offset between the GPS time and the 1588 time is determined, that is, a 1588 time offset value is determined. In this way, the 1588 time may be compensated for at the end, so that the precision of the 1588 time may reach or be close to the precision of the GPS time. In addition, the 1588 terminal may send the obtained 1588 time offset value to another 1588 device, and another 1588 device that does not have the capability of obtaining a GPS time can also compensate for a 1588 time.

Figure 6:
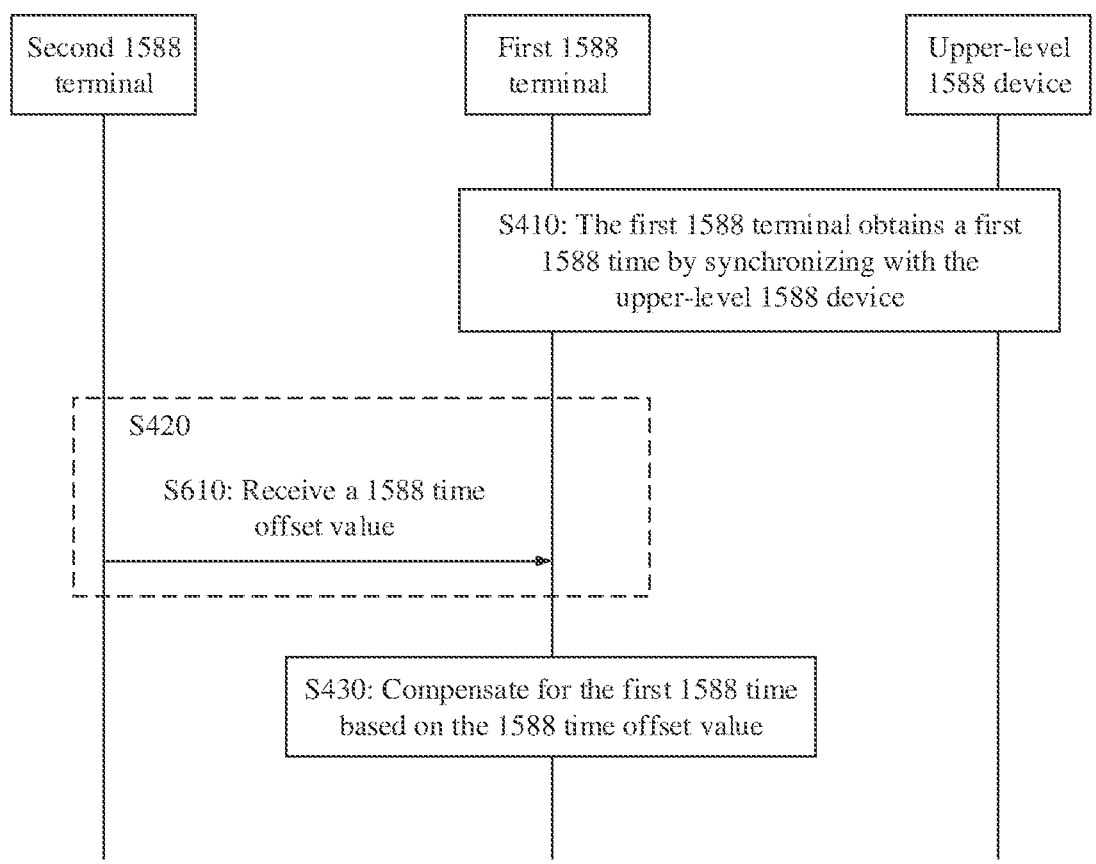
FIG. 6 is a signaling exchange diagram of another 1588 time synchronization offset adjustment method according to an embodiment of this application.

FIG. 6 is a signaling exchange diagram of another 1588 time synchronization offset adjustment method according to an embodiment of this application. The method shown in FIG. 6 is an example of the embodiment shown in FIG. 4. For example, S610 is an example of S420. For related content in S410 and S430 in FIG. 6, refer to related content in S410 and S430 in FIG. 4. Specifically, in this embodiment of this application, an example in which a first 1588 terminal does not have a capability of obtaining a reference time, the reference time is a GPS time, and an upper-level 1588 device is an access layer device is used for description. It should be noted that the reference time may be another time, for example, a BeiDou navigation satellite system time or a GLONASS time, or may be a time obtained by using another time synchronization protocol, and the upper-level 1588 device may alternatively be another 1588 device, for example, a clock server. This is not limited in this embodiment of this application. The method may specifically include the following steps.

S610: The first 1588 terminal receives a 1588 time offset value from a third 1588 terminal. The 1588 time offset value is a difference between a third 1588 time and a third GPS time, the third 1588 time is a 1588 time obtained by the third 1588 terminal by synchronizing with the upper-level 1588 device, and the third GPS time is a GPS time received by the third 1588 terminal from a GPS clock source.

For example, with reference to FIG. 2, the first 1588 terminal may be a 1588 terminal 212 or a 1588 terminal 213. In this case, the third 1588 terminal may be a 1588 terminal 211.

The first 1588 terminal may directly receive the 1588 time offset value from the third 1588 terminal. For example, the first 1588 terminal may receive the 1588 time offset value through an X2 interface.

The first 1588 terminal may alternatively receive the 1588 time offset value from the third 1588 terminal through a 1588 terminal management device.

For a manner in which the third 1588 terminal determines the 1588 time offset value, refer to related content of a manner in which the first 1588 terminal determines the 1588 time offset value in FIG. 5. Details are not described herein again.

In another embodiment, a 1588 time obtained through synchronization may be compensated for on an edge bearer device. This reduces an error caused by asymmetric delays on transmit and receive links, and improves precision of the 1588 time obtained through synchronization.

Figure 7:
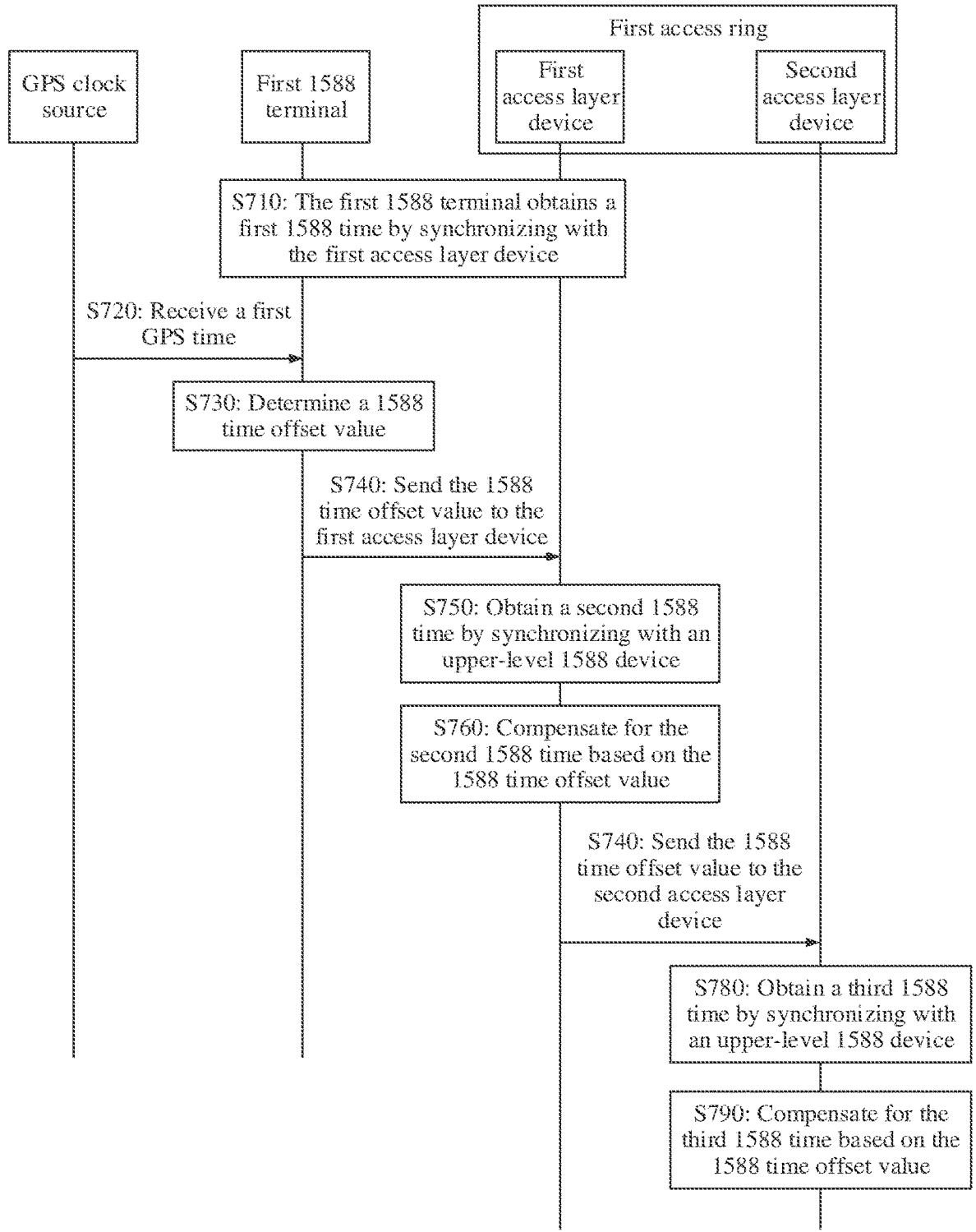
FIG. 7 is a signaling exchange diagram of another 1588 time synchronization offset adjustment method according to an embodiment of this application.

FIG. 7 is a signaling exchange diagram of another 1588 time synchronization offset adjustment method according to an embodiment of this application. The method shown in FIG. 7 is an example in which an edge bearer device compensates for a 1588 time obtained through synchronization. The edge bearer device is an access layer device. As shown in FIG. 7, the method specifically includes the following steps.

S710: A first 1588 terminal obtains a first 1588 time by synchronizing with a first access layer device.

For example, with reference to FIG. 2, the first access layer device may be an upper-level 1588 device of the first 1588 terminal, the first 1588 terminal may be a 1588 terminal 211, a 1588 terminal 221, a 1588 terminal 222, or the like, and the first access layer device may be an upper-level 1588 device, namely, an access layer device 1123, of the 1588 terminal 211, or the first access layer device may be an upper-level 1588 device, namely, an access layer device 1144, of the 1588 terminal 221 and the 1588 terminal 222.

A manner of obtaining the first 1588 time may be the time synchronization manner shown with reference to FIG. 3. Details are not described again.

S720: The first 1588 terminal receives a first GPS time from a GPS clock source.

For step S720, refer to related descriptions in S510 in the embodiment shown in FIG. 5. Details are not described again.

S730: The first 1588 terminal determines a 1588 time offset value. The 1588 time offset value is a difference between the first 1588 time and the first GPS time.

For step S730, refer to related descriptions in S520 in the embodiment shown in FIG. 5. Details are not described again.

S740: The first 1588 terminal sends the 1588 time offset value to the first access layer device.

The first 1588 terminal may report the 1588 time offset value through a dedicated interface or a message.

The first 1588 terminal may report the 1588 time offset value aperiodically or periodically, or may report the 1588 time offset value according to an instruction of a 1588 terminal management device.

For example, with reference to FIG. 2, the first 1588 terminal may be the 1588 terminal 211, the 1588 terminal 221, or the 1588 terminal 222. The first access layer device may be the access layer device 1123 or the access layer device 1144.

S750: The first access layer device obtains a second 1588 time by synchronizing with an upper-level 1588 device. The upper-level bearer network device is an upper-level device of the first access layer device.

The upper-level 1588 device of the first access layer device may be an access layer device or an aggregation layer device. For example, with reference to FIG. 2, an upper-level 1588 device of the access layer device 1123 is an access layer device, and an upper-level 1588 device of the access layer device 1144 is an aggregation layer device.

A manner of obtaining the second 1588 time may be the time synchronization manner shown with reference to FIG. 3. Details are not described again. In this embodiment of this application, because the first access layer device includes a clock of a port and a clock of an internal system, the second 1588 time may be a 1588 time obtained through synchronization by the clock of the port, or may be a 1588 time obtained through synchronization by the clock of the internal system.

In addition, step S750 may be performed after the first access layer device receives the 1588 time offset value, or may be performed before the 1588 time offset value is received.

S760: The first access layer device compensates for the second 1588 time based on the 1588 time offset value.

The first access layer device may perform, based on the 1588 time offset value, compensation in the internal system or on the port of the first access layer device. The port of the first access layer device may be classified into a client-side port or a line-side port. The client-side port is connected to a 1588 device, and the line-side port is connected to a bearer network device. The bearer network device may be an access layer device or an aggregation layer device.

For example, after receiving the 1588 time offset value, the first access layer device may compensate for a 1588 time obtained through synchronization by the clock of the internal system of the first access layer device. After compensating for the 1588 time obtained through synchronization, the first access layer device may synchronize a 1588 time obtained after compensation to the clock of the port of the first access layer device. In this way, a 1588 time obtained through synchronization by a 1588 terminal from the port of the first access layer device is the 1588 time obtained after compensation.

For another example, the first access layer device may compensate for a 1588 time obtained through synchronization by a clock of the client-side port. In this case, a 1588 time obtained through synchronization by the 1588 terminal connected to the client-side port of the first access layer device from the port is a 1588 time obtained after compensation.

In addition, when performing time synchronization with a 1588 terminal, the first access layer device may further compensate, based on the 1588 time offset value, for a timestamp sent to the 1588 terminal. In this case, with reference to FIG. 3, any one or more of a timestamp $t_1$ and a timestamp $t_4$ that are received by the 1588 terminal are values obtained after compensation is performed based on the 1588 time offset value, where the timestamp $t_1$ is obtained based on the 1588 time offset value and a timestamp, at a moment $t_1$, of the client-side port of the first access layer device, and the timestamp $t_4$ is obtained based on the 1588 time offset value and a timestamp, at a moment $t_4$, of the client-side port of the first access layer device.

For another example, the first access layer device may compensate, based on the 1588 time offset value, for a 1588 time obtained through synchronization by a clock of the line-side port, and synchronize a 1588 time obtained after compensation on the line-side port with the clock of the internal system and the clock of the client-side port, to further synchronize the 1588 time to a 1588 terminal.

In addition, when the first access layer device performs 1588 time synchronization with the upper-level bearer device, the first access layer device may compensate, based on the 1588 time offset value, for a received timestamp sent by the upper-level bearer device. In this case, with reference to FIG. 3, when a time offset O is calculated, the time offset O is calculated after compensation is performed, based on the 1588 time offset value, for either or both of a timestamp $t_1$ and a timestamp $t_4$, where the timestamp $t_1$ is a timestamp, at a moment $t_1$, of a client-side port of the upper-level bearer device, and the timestamp $t_4$ is a timestamp, at a moment $t_4$, of a line-side port of the upper-level bearer device. Alternatively, the time offset O may be calculated after compensation is performed, based on the 1588 time offset value, for either or both of a timestamp $t_3$ and a timestamp $t_2$, where the timestamp $t_2$ is a timestamp, at a moment $t_2$, of the line-side port of the first access layer device, and the timestamp $t_4$ is a timestamp, at a moment $t_4$, of the line-side port of the first access layer device.

For example, with reference to FIG. 2, the first access layer device may be the access layer device 1123, and the first 1588 terminal may be the 1588 terminal 211. The 1588 terminal 211 may perform 1588 time synchronization with the access layer device 1123, to obtain the first 1588 time. The 1588 terminal 211 may obtain the first GPS time through a satellite system 500, and may determine the 1588 time offset value based on the first 1588 time and the first GPS time. The 1588 terminal 211 may send the 1588 time offset value to the access layer device 1123. The access layer device 1123 may compensate for a 1588 time obtained through synchronization from an access layer device 1124, or the access layer device may compensate for a 1588 time synchronized to the 1588 terminal 211, a 1588 terminal 212, or a 1588 terminal 213. The access layer device 1123 may alternatively compensate for a time inside the access layer device. When delays on transmit and receive links inside an access ring 112 are symmetric, the access layer device 1123 may further synchronize the 1588 time offset value to an access layer device 1122, the access layer device 1124, and an access layer device 1121.

In addition, there may be a plurality of 1588 terminals that are served by the first access layer device and that have a capability of obtaining a GPS time. In this case, the 1588 terminal management device may designate a 1588 terminal to determine a 1588 time offset value, and the designated 1588 terminal transfers and shares the offset value, and sends the 1588 time offset value to the first access layer device. Alternatively, the 1588 terminals that have the capability of obtaining a GPS time from a GPS clock source determine and upload 1588 time offset values. Based on this, when the first access layer device performs 1588 time compensation, a 1588 time offset value determined by a 1588 terminal that has the capability of obtaining a GPS time from a GPS clock source is preferentially used to perform compensation on a port connected to the 1588 terminal, and an average value of the 1588 time offset values uploaded by the 1588 terminals that are served by the first access layer device and that have the capability of obtaining a GPS time from a GPS clock source is used to perform compensation on a port connected to a 1588 terminal that does not have the capability of obtaining a GPS time from a GPS clock source.

Then, the first access layer device may send the 1588 time offset value to a bearer network management device, so that the bearer network management device monitors a bearer network device based on the 1588 time offset value. In addition, the first access layer device may directly compensate for the second 1588 time based on the 1588 time offset value, or may compensate for the second 1588 time based on an indication of the bearer network management device. The bearer network management device has identifiers of access layer devices. After receiving a 1588 time offset value reported by an access layer device, the bearer network management device may indicate the access layer device to perform a compensation operation in an instruction triggering manner. Based on this, the method may include the following step. The first access layer device receives indication information from the bearer network management device, where the indication information is used to indicate the first access layer device to compensate for the second 1588 synchronization time based on the 1588 time offset value.

In another embodiment, when delays on transmit and receive links of an access ring are symmetric, access layer devices on the same access ring may share a 1588 time offset value. Based on the foregoing steps, this embodiment of this application may further include the following steps.

S770: The first access layer device sends the 1588 time offset value to a second access layer device, where both the first access layer device and the second access layer device are located on a first access ring, and delays on transmit and receive links of the first access ring are symmetric.

That delays on transmit and receive links of an access ring are symmetric may mean that a delay on a transmit link of the access ring and a delay on a receive link of the access ring are the same. For example, single-fiber bidirectional deployment may be used between the access layer devices on the access ring. For another example, whether the delays on the transmit and receive links of the access ring are symmetric may be determined by the bearer network management device, and the bearer network management device may determine, through measurement and calculation, or through predefinition, whether the delays on the transmit and receive links of the access ring are symmetric.

For example, with reference to FIG. 2, delays on transmit and receive links of the access ring 112 or an access ring 114 are symmetric, the first access layer device may be the access layer device 1123, and the second access layer device may be the access layer device 1124, the access layer device 1121, or the access layer device 1122. Alternatively, the first access layer device is the access layer device 1144, and the second access layer device is an access layer device 1143, an access layer device 1142, or an access layer device 1141.

In addition, the first access layer device may send the 1588 time offset value to the second access layer device through the bearer network management device. The bearer network management device has identifiers of access layer devices. After receiving the 1588 time offset value reported by the first access layer device, the bearer network management device may send the 1588 time offset value to the second access layer device that is on a same access ring as the first access layer device.

S780: The second access layer device obtains a third 1588 time by synchronizing with an upper-level 1588 device.

The upper-level 1588 device of the second access layer device may be an access layer device or an aggregation layer device. For example, with reference to FIG. 2, an upper-level 1588 device of the access layer device 1124 is an aggregation layer device, and an upper-level device of the access layer device 1142 is an access layer device.

A manner of obtaining the third 1588 time may be the time synchronization manner shown with reference to FIG. 3. Details are not described again.

The upper-level 1588 device is a core layer device or a clock server.

In addition, step S780 may be performed before the second access layer device receives the 1588 time offset value, or may be performed after the second access layer device receives the 1588 time offset value.

S790: The second access layer device compensates for the third 1588 time based on the 1588 time offset value.

The second access layer device may perform, based on the 1588 time offset value, compensation in an internal system or on a port of the second access layer device. This process is similar to a process of performing 1588 time compensation by the first access layer device in step S760, and the two processes may be understood with reference to each other.

If the second access layer device receives 1588 time offset values sent by a plurality of access layer devices on the same access ring, the second access layer device may compensate for the third 1588 time based on an average value of 1588 time offset values sent by all access layer devices of the first access ring.

In addition, when an active/standby link change occurs in a bearer network due to factors such as fault-triggered switchover, a synchronization time offset may be caused. When compensation for a 1588 time cannot be processed in real time, the following solution may be used to supplement the embodiment shown in FIG. 7, to improve stability of the overall solution.

The bearer network senses the active/standby link change as soon as possible. Therefore, a bearer network device may measure a relative offset value between active and standby paths and perform compensation based on the relative offset value. This ensures that compensation can be performed for a standby path based on the relative offset value before and after link switching, so that a path (absolute) offset from an end device is consistent after the link change.

Specifically, a passive port may be configured on the standby path, the compensation offset between the active and standby paths is measured, and when switchover occurs in the bearer network, compensation is automatically performed on the port based on the relative offset between the active and standby paths before and after the switchover.

Ports are classified into three types: a master port (an M port in FIG. 2), a slave port (an S port in FIG. 2), and a passive port (a P port in FIG. 2). The slave port obtains, through synchronization, a 1588 time from an upper-level master port based on the 1588 protocol.

Further, a passive port may be configured on a 1588 ring breaking node (including a standby port that may be enabled due to path switching) at a core layer, an aggregation layer, or an access layer. With reference to FIG. 2, a link between an aggregation layer device 1215 and an aggregation layer device 1213 is a standby link, and a port that is on the aggregation layer device 1215 and that is connected to the aggregation layer device 1213 may be configured as a passive port. When a link between the aggregation layer device 1213 and an aggregation layer device 1212 fails, the link between the aggregation layer device 1213 and the aggregation layer device 1215 is enabled, and compensation is performed on the passive port based on a compensation offset between the active and standby paths.

In addition, each passive port may report a measured offset offset (namely, an offset between ports of active and standby paths) to a transmission network control device. After a fault occurs, a path is automatically reselected. The transmission network control device performs compensation on a local passive port or a peer port of the local passive port based on an offset offset of the passive port before the fault. In addition, if the local passive port is changed to a slave port after path switchover, compensation is performed on the passive port based on the offset. If the peer port of the passive port is changed to a slave port after path switchover, compensation is performed on the peer port of the passive port based on a negative value of the offset. After the compensation, path offsets of a clock obtained by a base station are consistent before and after the switchover.

The passive port is defined based on the 1588 protocol and can measure a delay offset between active and standby paths.

According to this embodiment of this application, the first access layer device may compensate for an offset of a 1588 time at the end of a bearer network, to compensate for the 1588 time at an edge of a synchronization network, that is, compensate for an offset caused by asymmetry of end to end (E2E) optical fibers, and compensate for a fixed offset inside a device in the synchronization network. Therefore, measurement and compensation do not need to be performed node by node, labor costs are greatly reduced, and precision of the 1588 time is improved.

Figure 8:
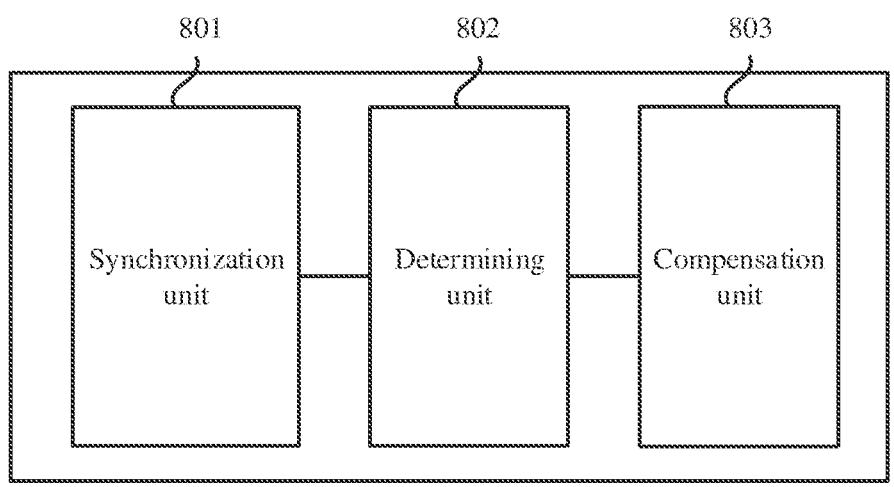
FIG. 8 is a schematic structural diagram of a 1588 time offset adjustment apparatus according to an embodiment of this application.

FIG. 8 is a schematic structural diagram of a 1588 time offset adjustment apparatus according to an embodiment of this application. The apparatus may be configured to perform the method performed by the 1588 terminal in FIG. 4, FIG. 5, or FIG. 6. The apparatus specifically includes a synchronization unit 801, configured to obtain a first 1588 time by synchronizing with an upper-level 1588 device of the apparatus, a determining unit 802, configured to determine a 1588 time offset value, and a compensation unit 803, configured to compensate for the first 1588 time based on the 1588 time offset value.

Optionally, the apparatus further includes a first receiving unit, configured to receive a first global positioning system GPS time from a GPS clock source, where the 1588 time offset value is a difference between the first 1588 time and the first GPS time.

Optionally, the apparatus further includes a first sending unit, configured to send the 1588 time offset value to a second 1588 terminal, where the 1588 time offset value is used to compensate for a second 1588 time, and the second 1588 time is a 1588 synchronization time obtained by the second 1588 terminal by synchronizing with the upper-level 1588 device of the apparatus.

Optionally, the apparatus further includes a second receiving unit, configured to receive first indication information from a 1588 terminal management device, where the first indication information is used to indicate the first 1588 terminal to send the 1588 time offset value to the second 1588 terminal.

Optionally, the apparatus further includes a second sending unit, configured to send the 1588 time offset value to the second 1588 terminal through the 1588 terminal management device.

Optionally, the determining unit 802 is specifically configured to receive the 1588 time offset value from a third 1588 terminal, where the 1588 time offset value is a difference between a third 1588 time and a third GPS time, the third 1588 time is a 1588 time obtained by the third 1588 terminal by synchronizing with the upper-level 1588 device of the apparatus, and the third GPS time is a GPS time received by the third 1588 terminal from a GPS clock source.

Optionally, the determining unit 802 is specifically configured to receive the 1588 time offset value from the third 1588 terminal through a 1588 terminal management device.

Figure 9:
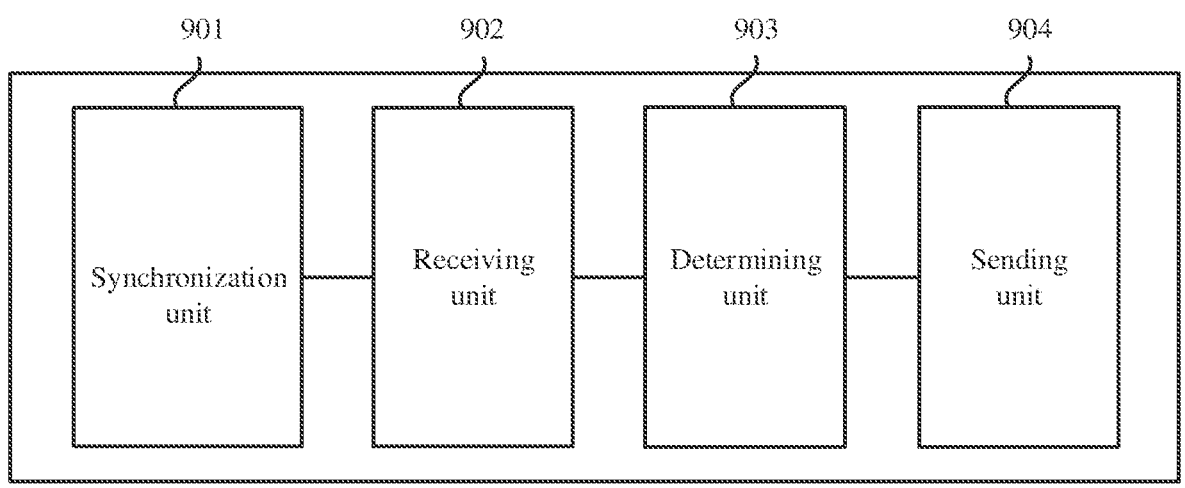
FIG. 9 is a schematic structural diagram of another 1588 time offset adjustment apparatus according to an embodiment of this application.

FIG. 9 is a schematic structural diagram of another 1588 time offset adjustment apparatus according to an embodiment of this application. The apparatus may be configured to perform the method performed by the 1588 terminal in FIG. 7. The apparatus specifically includes a synchronization unit 901, configured to obtain a first 1588 time by synchronizing with a first access layer device, a receiving unit 902, configured to receive a first GPS time from a GPS clock source, a determining unit 903, configured to determine a 1588 time offset value, where the 1588 time offset value is a difference between the first 1588 time and the first GPS time, and a sending unit 904, configured to send the 1588 time offset value to the first access layer device, where the 1588 time offset value is used to compensate for a fourth 1588 time, and the fourth 1588 time is a 1588 time obtained by the first access layer device by synchronizing with an upper-level 1588 device of the first access layer device.

Figure 10:
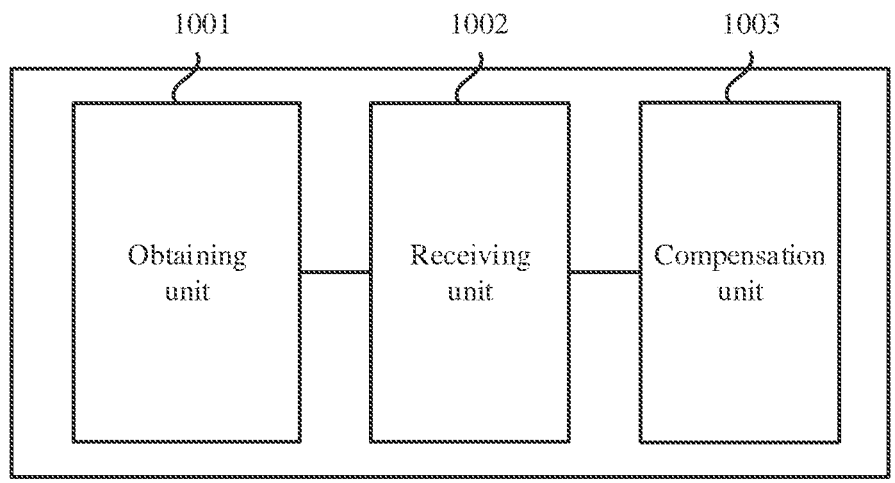
FIG. 10 is a schematic structural diagram of another 1588 time offset adjustment apparatus according to an embodiment of this application.

FIG. 10 is a schematic structural diagram of another 1588 time offset adjustment apparatus according to an embodiment of this application. The apparatus may be configured to perform the method performed by the access layer device in FIG. 7. The apparatus specifically includes an obtaining unit 1001, configured to obtain a fourth 1588 time by synchronizing with an upper-level 1588 device of the apparatus, a receiving unit 1002, configured to receive a 1588 time offset value, and a compensation unit 1003, configured to compensate for the fourth 1588 time based on the 1588 time offset value.

Optionally, the compensation unit 1003 is specifically configured to compensate for the fourth 1588 time on a port between the apparatus and the upper-level 1588 device based on the 1588 time offset value, or compensate for the fourth 1588 time on a port between the apparatus and a 1588 terminal based on the 1588 time offset value, or if a system time is updated to the fourth 1588 time after the fourth 1588 time is obtained, compensate for the system time (for example, the time of the internal system in the foregoing embodiment).

Optionally, the apparatus further includes a sending unit, configured to send the 1588 time offset value to a bearer network management device.

Optionally, the receiving unit 1002 is further configured to receive indication information from the bearer network management device, where the indication information is used to indicate the compensation unit 1003 to compensate for the fourth 1588 time based on the 1588 time offset value.

Optionally, the receiving unit 1002 is specifically configured to receive the 1588 time offset value from a first 1588 terminal, where the 1588 time offset value is a difference between a first 1588 time and a first GPS time, the first 1588 time is a 1588 time obtained by the first 1588 terminal by synchronizing with the first access layer device, and the first GPS time is a GPS time received by the first 1588 terminal from a GPS clock source.

Optionally, the sending unit is further configured to send the 1588 time offset value to a second access layer device, where the 1588 time offset value is used to compensate for a fifth 1588 time obtained by the second access layer device by synchronizing with an upper-level 1588 device of the second access layer device, where both the first access layer device and the second access layer device are located on a first access ring, and delays on transmit and receive links of the first access ring are symmetric.

Optionally, the sending unit is further configured to send the 1588 time offset value to the second access layer device through a bearer network management device.

Optionally, the receiving unit 1002 is further configured to receive the 1588 time offset value from a third access layer device, where the 1588 time offset value is a difference between a sixth 1588 time and a sixth GPS time, the sixth 1588 time is a 1588 time obtained by a fourth 1588 terminal by synchronizing with the third access layer device, and the sixth GPS time is a GPS time received by the fourth 1588 terminal from a GPS clock source, where both the first access layer device and the third access layer device are located on a first access ring, and delays on transmit and receive links of the first access ring are symmetric.

Figure 11:
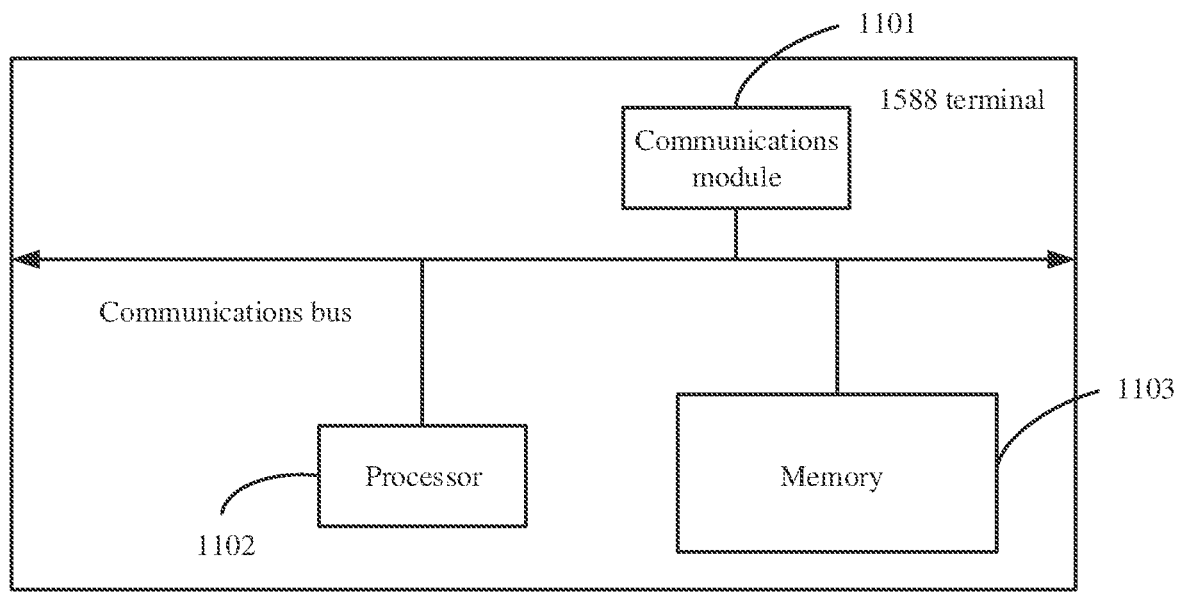
FIG. 11 is a schematic structural diagram of a 1588 terminal according to an embodiment of this application.

FIG. 11 is a schematic structural diagram of a 1588 terminal according to an embodiment of this application. As shown in FIG. 11, the 1588 terminal includes a communications module 1101, a processor 1102, and a memory 1103, where the memory 1102 is configured to store a program, the communications module 1101 is configured to interact with an access layer device or a 1588 terminal, and the processor 1102 is configured to execute the program stored in the memory 1103, to control the 1588 terminal to perform the method, in FIG. 4, FIG. 5, or FIG. 6, performed by the 1588 terminal that does not have the capability of obtaining a reference time.

Figure 12:
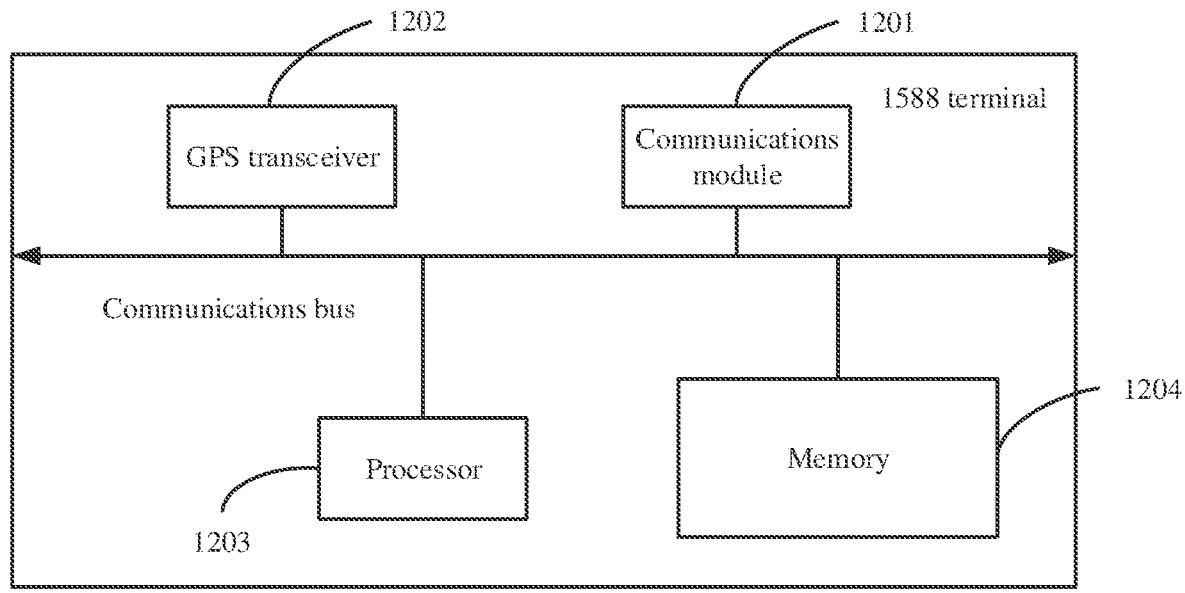
FIG. 12 is a schematic structural diagram of another 1588 terminal according to an embodiment of this application.

FIG. 12 is a schematic structural diagram of another 1588 terminal according to an embodiment of this application. The 1588 terminal includes a communications module 1201, a GPS transceiver 1202, a processor 1203, and a memory 1204, where the memory 1204 is configured to store a program, the communications module 1201 is configured to interact with an access layer device, a 1588 terminal, or a 1588 terminal management device, the GPS transceiver 1202 is configured to receive a GPS time, and the processor 1203 is configured to execute the program stored in the memory 1204, to control the 1588 terminal to perform the method, in FIG. 4, FIG. 5, FIG. 6, or FIG. 7, performed by the 1588 terminal that has a capability of obtaining a reference time.

Figure 13:
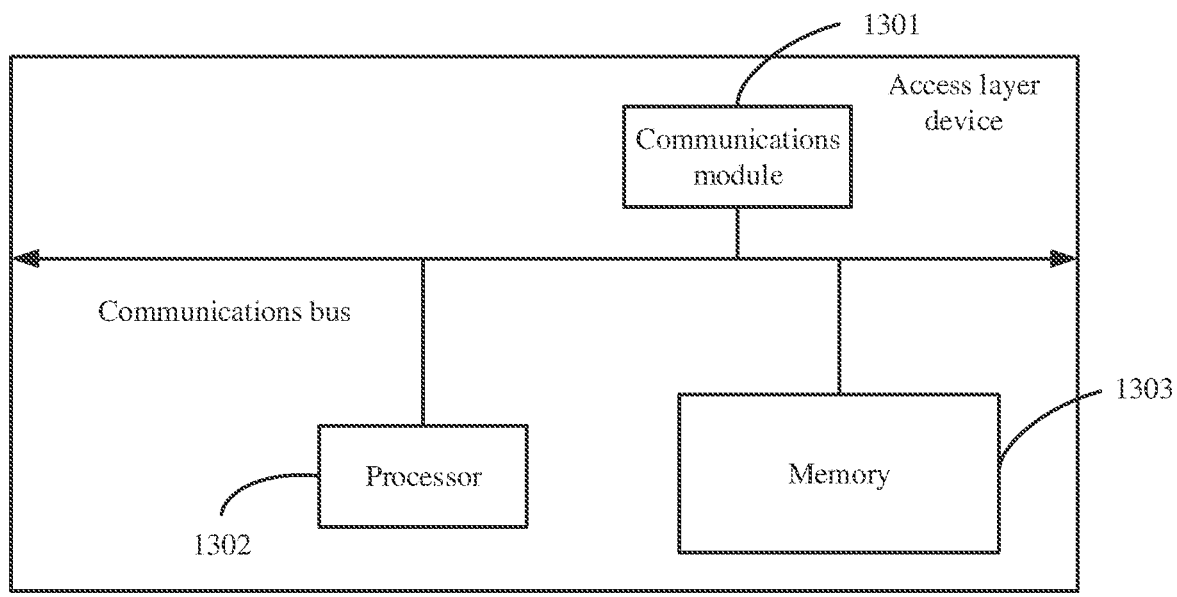
FIG. 13 is a schematic structural diagram of an access layer device according to an embodiment of this application.

FIG. 13 is a schematic structural diagram of an access layer device according to an embodiment of this application. The access layer device includes a communications module 1301, a processor 1302, and a memory 1303. The memory 1303 is configured to store a program. The communications module 1301 is configured to interact with a 1588 terminal, a bearer network device, or a bearer network management device. The communications module 1301 may include a plurality of ports, which are separately used to communicate with the 1588 terminal and the bearer network device. A working mode of a port through which the communications module 1301 communicates with the 1588 terminal may be a 1588 master mode, and a working mode of a port through which the communications module 1301 communicates with the bearer network device may be a 1588 slave mode, or may be the 1588 master mode. The bearer network device includes an access layer device. The processor 1302 is configured to execute the program stored in the memory 1303, to control the access layer device to perform the method, in FIG. 4, FIG. 5, FIG. 6, or FIG. 7, performed by the access layer device.

All or some of the foregoing embodiments of this application may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable medium to another computer-readable medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus comprising:
   at least one processor; and
   a memory coupled to the at least one processor and storing programming instructions that, when executed by the processor, cause a first 1588 terminal implementing 1588 version 2 of an institute of electrical and electronics engineers (IEEE) standard for a precision clock synchronization protocol for networked measurement and control systems to:
   obtain a first 1588 time by synchronizing with an upper-level 1588 device of the first 1588 terminal;
   determine a 1588 time offset value;
   compensate for the first 1588 time based on the 1588 time offset value; and
   send the 1588 time offset value to a second 1588 terminal, wherein the 1588 time offset value indicates to compensate for a second 1588 time, and wherein the second 1588 time is a 1588 synchronization time obtained by the second 1588 terminal by synchronizing with the upper-level 1588 device of the first 1588 terminal.

2. The apparatus according to claim 1, wherein the instructions, when executed by the processor, further cause the first 1588 terminal to:
   receive a first global positioning system (GPS) time from a GPS clock source, wherein the 1588 time offset value is a difference between the first 1588 time and the first GPS time.

3. The apparatus according to claim 1, wherein the instructions, when executed by the processor, further cause the first 1588 terminal to:
   receive, by the first 1588 terminal, first indication information from a 1588 terminal management device, wherein the first indication information indicates to the first 1588 terminal to send the 1588 time offset value to the second 1588 terminal.

4. The apparatus according to claim 1, wherein the instructions, that, when executed by the processor, cause the first 1588 terminal to determine the 1588 time offset value include instructions that, when executed by the processor, cause the first 1588 terminal to:
   receive the 1588 time offset value from a third 1588 terminal, wherein the 1588 time offset value is a difference between a third 1588 time and a second global positioning system (GPS) time, wherein the third 1588 time is a 1588 time obtained by the third 1588 terminal by synchronizing with the upper-level 1588 device of the first 1588 terminal, and wherein the second GPS time is a GPS time received by the third 1588 terminal from a GPS clock source.

5. An apparatus, comprising
at least one processor; and
a memory coupled to the at least one processor and storing a program for execution by the at least one processor, the program having instructions that cause a first access layer device associated with the apparatus to:
obtain a first 1588 time by synchronizing with an upper-level 1588 device of the first access layer device, wherein the first 1588 time is a time for use with 1588 version 2 of an institute of electrical and electronics engineers (IEEE) standard for a precision clock synchronization protocol for networked measurement and control systems
receive a 1588 time offset value;
compensate for the first 1588 time based on the 1588 time offset value; and
send the 1588 time offset value to a second access layer device, wherein the 1588 time offset value indicates to compensate for a third 1588 time obtained by the second access layer device by synchronizing with an upper-level 1588 device of the second access layer device, wherein both the first access layer device and the second access layer device are located on a first access ring, and wherein delays on transmit and receive links of the first access ring are symmetric.

6. The apparatus according to claim 5, wherein the instructions that cause the first access layer device to compensate for the first 1588 time include instructions that cause the first access layer device to perform at least one of:
compensate for the first 1588 time on a port between the first access layer device and the upper-level 1588 device of the first access layer device based on the 1588 time offset value; or
compensate for the first 1588 time on a port between the first access layer device and a second 1588 terminal based on the 1588 time offset value; or
compensate for a system time of the first access layer device in response to the system time being updated to the first 1588 time after the first access layer device obtains the first 1588 time.

7. The apparatus according to claim 5, wherein the program further has instructions that cause the first access layer device to:
send the 1588 time offset value to a bearer network management device.

8. The apparatus according to claim 7, wherein the program further has instructions that cause the first access layer device to:
receive indication information from the bearer network management device, wherein the indication information indicates to the first access layer device to compensate for the first 1588 time based on the 1588 time offset value.

9. The apparatus according to claim 5, wherein instructions that cause the first access layer device to receive the 1588 time offset value include instructions that cause the first access layer device to:
receive the 1588 time offset value from a first 1588 terminal, wherein the 1588 time offset value is a difference between a second 1588 time and a first global positioning system (GPS) time, wherein the second 1588 time is a 1588 time obtained by the first 1588 terminal by synchronizing with the first access layer device, and wherein the first GPS time is a GPS time received by the first 1588 terminal from a GPS clock source.

10. The apparatus according to claim 5, wherein the instructions that cause the first access layer device to receive the 1588 time offset value include instructions that cause the first access layer device to:
receive the 1588 time offset value from a third access layer device, wherein the 1588 time offset value is a difference between a fourth 1588 time and a second global positioning system (GPS) time, wherein the fourth 1588 time is a 1588 time obtained by a third 1588 terminal by synchronizing with the third access layer device, and wherein the second GPS time is a GPS time received by the third 1588 terminal from a GPS clock source, wherein both the first access layer device and the third access layer device are located on a first access ring, and wherein delays on transmit and receive links of the first access ring are symmetric.

11. A method, comprising:
obtaining, by a first 1588 terminal implementing 1588 version 2 of an institute of electrical and electronics engineers (IEEE) standard for a precision clock synchronization protocol for networked measurement and control systems, a first 1588 time by synchronizing with an upper-level 1588 device of an apparatus associated with the 1588 terminal;
determining, by the first 1588 terminal, a 1588 time offset value;
compensating, by the first 1588 terminal, for the first 1588 time based on the 1588 time offset value; and
sending, by the first 1588 terminal, the 1588 time offset value to a second 1588 terminal, wherein the 1588 time offset value indicates to compensate for a second 1588 time, and wherein the second 1588 time is a 1588 synchronization time obtained by the second 1588 terminal by synchronizing with the upper-level 1588 device.

12. The method according to claim 11, further comprising:
receiving, by the first 1588 terminal, a first global positioning system (GPS) time from a GPS clock source, wherein the 1588 time offset value is a difference between the first 1588 time and the first GPS time.

13. The method according to claim 11, further comprising:
receiving, by the first 1588 terminal, first indication information from a 1588 terminal management device, wherein the first indication information indicates to the first 1588 terminal to send the 1588 time offset value to the second 1588 terminal.

14. The method according to claim 11, wherein the determining the 1588 time offset value comprises receiving, by the first 1588 terminal, the 1588 time offset value from a third 1588 terminal, wherein the 1588 time offset value is a difference between a third 1588 time and a second global positioning system (GPS) time, wherein the third 1588 time is a 1588 time obtained by the third 1588 terminal by synchronizing with the upper-level 1588 device, and wherein the second GPS time is a GPS time received by the third 1588 terminal from a GPS clock source.

15. A method, comprising:
obtaining, by a first access layer device, a first 1588 time by synchronizing with an upper-level 1588 device of an apparatus, wherein the first 1588 time is a time for use with 1588 version 2 of an institute of electrical and electronics engineers (IEEE) standard for a precision clock synchronization protocol for networked measurement and control systems;

receiving, by the first access layer device, a 1588 time offset value;

compensating, by the first access layer device, for the first 1588 time based on the 1588 time offset value; and sending the 1588 time offset value to a second access layer device, wherein the 1588 time offset value indicates to compensate for a third 1588 time obtained by the second access layer device by synchronizing with an upper-level 1588 device of the second access layer device, wherein both the first access layer device and the second access layer device are located on a first access ring, and wherein delays on transmit and receive links of the first access ring are symmetric.

16. The method according to claim 15, wherein the compensating for the first 1588 time comprises performing at least one of:

compensating, by the first access layer device, for the first 1588 time on a port between the apparatus and the upper-level 1588 device based on the 1588 time offset value; or compensating, by the first access layer device, for the first 1588 time on a port between the apparatus and a 1588 terminal based on the 1588 time offset value; or compensating, by the first access layer device, for a system time in response to the system time being updated to the first 1588 time after the first 1588 time is obtained.

17. The method according to claim 15, further comprising:

sending, by the first access layer device, the 1588 time offset value to a bearer network management device.

18. The method according to claim 17, further comprising:

receiving indication information from the bearer network management device, wherein the indication information indicates to the first access layer device to compensate for the first 1588 time based on the 1588 time offset value.

19. The method according to claim 15, wherein receiving, by the first access layer device, the 1588 time offset value comprising:

receiving the 1588 time offset value from a first 1588 terminal, wherein the 1588 time offset value is a difference between a second 1588 time and a first global positioning system (GPS) time, wherein the second 1588 time is a 1588 time obtained by the first 1588 terminal by synchronizing with the first access layer device, and wherein the first GPS time is a GPS time received by the first 1588 terminal from a GPS clock source.

* * * * *

UNITED STATES PATENT AND TRADEMARK OFFICE
CERTIFICATE OF CORRECTION

PATENT NO. : 11,503,560 B2
APPLICATION NO. : 17/160558
DATED : November 15, 2022
INVENTOR(S) : Zhaogen Yin et al.

It is certified that error appears in the above-identified patent and that said Letters Patent is hereby corrected as shown below:

In the Claims

Claim 1, Column 28, Line 22; delete "a" before "first".

Claim 15, Column 30, Line 61; insert --terminal-- between "1588" and "time".

Signed and Sealed this
Twentieth Day of December, 2022

Katherine Kelly Vidal
*Director of the United States Patent and Trademark Office*